US008396578B2

(12) United States Patent
Miyata et al.

(10) Patent No.: US 8,396,578 B2
(45) Date of Patent: Mar. 12, 2013

(54) MIXING SIGNAL PROCESSING APPARATUS AND MIXING SIGNAL PROCESSING INTEGRATED CIRCUIT

(75) Inventors: Tomomi Miyata, Hamamatsu (JP); Toshifumi Kunimoto, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 13/272,205

(22) Filed: Oct. 12, 2011

(65) Prior Publication Data

US 2012/0027232 A1 Feb. 2, 2012

Related U.S. Application Data

(62) Division of application No. 12/056,099, filed on Mar. 26, 2008.

(30) Foreign Application Priority Data

Mar. 28, 2007 (JP) ................................ 2007-083139
Mar. 28, 2007 (JP) ................................ 2007-083140
Mar. 28, 2007 (JP) ................................ 2007-083141
Mar. 28, 2007 (JP) ................................ 2007-083142

(51) Int. Cl.
*G06F 17/00* (2006.01)

(52) U.S. Cl. ......................................... 700/94; 381/119

(58) Field of Classification Search ..................... 700/94
See application file for complete search history.

(56) References Cited

U.S. PATENT DOCUMENTS 5,744,741 A 4/1998 Nakajima et al.
5,842,014 A 11/1998 Brooks et al.
6,351,475 B1 2/2002 Okamura
7,058,189 B1 6/2006 Grimm et al.
7,653,448 B2 1/2010 Zoso et al.
2002/0133249 A1 9/2002 Fay et al.
2003/0021429 A1* 1/2003 Ratcliff et al. ................ 381/119
2003/0225468 A1 12/2003 Abe
2005/0144215 A1* 6/2005 Simkins et al. ............... 708/620
2005/0190933 A1 9/2005 Hamada et al.
2006/0095620 A1 5/2006 Dreps et al.

(Continued)

FOREIGN PATENT DOCUMENTS

EP 1 571 768 A2 9/2005
JP 11-085155 A 3/1999

(Continued)

OTHER PUBLICATIONS

Yamaha DME 64 manual, copyright 2004.*

(Continued)

*Primary Examiner* — Paul McCord
(74) *Attorney, Agent, or Firm* — Morrison & Foerster LLP

(57) ABSTRACT

User is allowed to designate a desired mode defining the respective numbers of channels and mixing buses, and processing for mixing input signals of the number of channels corresponding to the designated mode is performed repetitively to generate signals for the individual buses. The time of arrival of the last step in the mixing processing for the number of channels, corresponding to the designated mode, is detected to output an accumulation result obtained at the last step, and new accumulation is started with a digital audio signal inputted at a step following the last step. Digital audio signals processed by a first signal processing circuit are stored into a memory and transmitted to a second signal processing circuit via a cascade-connection. The second signal processing circuit adds the audio signal, processed for each of the steps, to audio signals input via the cascade-connection and writes added signal into the memory.

4 Claims, 11 Drawing Sheets

RELATIONSHIP BETWEEN MODE AND NUMBERS OF CHANNELS & BUSES

| MODE | NUMBER OF INPUT CHANNELS | NUMBER OF MIXING BUSES |
|---|---|---|
| 1 | 32 | 96 |
| 2 | 64 | 48 |
| 3 | 24 | 128 |
| 4 | 48 | 64 |

U.S. PATENT DOCUMENTS

| | | | |
|---|---|---|---|
| 2007/0043804 | A1 | 2/2007 | Fibaek |
| 2008/0243280 | A1 | 10/2008 | Miyata et al. |
| 2012/0027231 | A1 | 2/2012 | Miyata et al. |
| 2012/0033833 | A1 | 2/2012 | Miyata et al. |

FOREIGN PATENT DOCUMENTS

| | | | |
|---|---|---|---|
| JP | 2003-255945 | A | 9/2003 |
| JP | 2005-244634 | A | 9/2005 |

OTHER PUBLICATIONS

Intel HD audio specification, copyright 2004.*
Yamaha DMX console: available for sale at least 2001.*
European Search Report mailed Nov. 24, 2009, for EP Patent Application No. 08102909.2, four pages.
European Search Report mailed Jan. 18, 2010, for EP Patent Application No. 08102909.2, 17 pages.
Yamaha. (2002). DME 32 Designer Owner's Manual, 424 pages.
Notice of Grounds for Rejection (Office Action) mailed Jan. 30, 2012, for JP Application No. P2007-083142, with English Translation, four pages.
Anonymous. (Aug. 9, 2012). "Integrated circuit," Wikipedia, located at <http://en.wikipedia.org/wiki/Integrated_circuit>, last visited Aug. 10, 2012, nine pages.

* cited by examiner

RELATIONSHIP BETWEEN MODE AND NUMBERS OF CHANNELS & BUSES

| MODE | NUMBER OF INPUT CHANNELS | NUMBER OF MIXING BUSES |
|---|---|---|
| 1 | 32 | 96 |
| 2 | 64 | 48 |
| 3 | 24 | 128 |
| 4 | 48 | 64 |

PATTERN TO BE DETECTED BY DETECTION

| MODE | BIT PATTERN TO BE DETECTED |
|---|---|
| 1 | "011111" ( "31" IN DECIMAL ) |
| 2 | "111111" ( "63" IN DECIMAL) |
| 3 | "010111" ( "23" IN DECIMAL) |
| 4 | "101111" ( "47" IN DECIMAL) |

MIXING SIGNAL PROCESSING APPARATUS AND MIXING SIGNAL PROCESSING INTEGRATED CIRCUIT

CROSS-REFERENCE TO RELATED APPLICATIONS

This application is a divisional of U.S. patent application Ser. No. 12/056,099, filed Mar. 26, 2008 which claims priority to Japanese Application No. 2007-083139, filed Mar. 28, 2007, Japanese Application No. 2007-083140, filed Mar. 28, 2007, Japanese Application No. 2007-083141, filed Mar. 28, 2007, and Japanese Application No. 2007-083142, filed Mar. 28, 2007, the entire disclosures of which are herein incorporated by reference in their entirety for all purposes.

BACKGROUND

The present invention relates to a digital signal processing apparatus for mixing which is suited for application to digital mixers etc. that process sound or audio signals.

Heretofore, there have been known digital signal processing apparatus (DSPs) which perform various arithmetic operations on input digital signals. The DSP is used, for example, in an electronic musical instrument, to perform an effect impartment process for imparting various audio effects to tones (digital audio signals) and other processes. Generally, the DSP includes an interface for connection with other DSPs; by connecting with a plurality of other DSPs via the interface, an enhanced arithmetic capability can be achieved as a whole. Among examples of interfaces for interconnecting DSPs are a serial I/O and audio bus I/O.

First, the serial I/O is explained. Each DSP includes a serial input port and serial output port. The serial output port of a first DSP is connected to the serial input port of a second DSP, so that audio signals are transferred from the first DSP to the second DSP. Namely, unidirectional transfer of digital signals is permitted between such directly-interconnected DSPs. In this case, one DAC period (one sampling period) is required for "serial conversion in the first DSP"→"signal transfer"→"parallel conversion in the second DSP".

Next, the audio bus I/O is explained. Each DSP includes an audio bus I/O. When a plurality of DSPs are to be interconnected, the audio bus I/Os of all of the DSPs are connected to bus lines of a common audio bus. Each of the DSPs transmits or transfers audio signals using frames allocated to the DSP. The "frames" are time sections allocated to the individual DSPs when data are to be transferred in a DAC period by time-divisional processing. The DSP at a transmitting end transfers, to the common audio bus, signals in a frame allocated thereto, and the DSP at a receiving end receives, from the common audio bus, the transferred signals in that frame. In this way, signals of a given DSP connected to the common audio bus can be transferred to another DSP. In this case, one DAC period is required for "transmitting DSP"→"audio bus"→"receiving DSP".

The DSP performing signal processing as noted above is also used in audio signal mixing processing by a digital mixer. In a digital mixer, a quantity of arithmetic operations performed in mixer processing increases/decreases in accordance with the number of channels to be processed, and thus, the arithmetic capability of just one DSP alone may sometimes be insufficient. In such a case, a plurality of DSPs are interconnected via the above-mentioned interfaces to allow signals to be transferred bi-directionally between the DSPs so that mixer processing is performed cooperatively by the DSPs.

The mixer processing comprises two major processing: adjustment processing, such as processing by an equalizer and compressor, for adjusting characteristics of audio signals; and mixing processing for mixing audio signals after controlling levels of the audio signals. Whereas the adjustment processing varies in content depending on the model type, operation mode, etc. of the processing apparatus, the mixing processing repeats same operations irrespective of the model type, operation mode, etc. of the processing apparatus. It is not efficient to use a programmable DSP in such monotonous repetition of the same operations.

Japanese Patent Application Laid-open Publication No. HEI-11-085155 and No. 2003-255945 (hereinafter referred to as "Patent Literature 1" and "Patent Literature 2", respectively) each disclose a prior art technique where a DSP for performing ordinary or normal signal processing and a DSP for performing mixing processing are integrated into one chip, although the disclosed DSPs are indented for use in a tone generator of an electronic musical instrument rather than in a digital mixer.

Patent Literature 1 discloses an integrated circuit in which are collectively incorporated a tone generation section for generating tones of a plurality of channels, a DSP section for performing the adjustment processing (e.g., effect impartment) and a mixer section for performing the mixing processing. The mixer section inputs signals of 96 channels, multiplies the input signals of the individual channels by eight different coefficients, performs mixing of the results of the multiplication via 32 mixing buses and then outputs resultant mixed signals of 32 channels. Here, the numbers of the input channels and mixing buses are fixed and non-changeable.

Patent Literature 2 too discloses an integrated circuit in which are collectively incorporated a tone generation section for generating tones of a plurality of channels, a DSP section for performing the adjustment processing and a mixer section for performing the mixing processing. The mixer section can select, for each of the input channels, which signal should be input and to which bus the signal should be output. The mixer section can select, per input channel, the numbers of times the coefficient multiplication and mixing in a mixing bus should be performed. Further, the mixer section can designate, for each of the mixing buses, signals of how many channels and of which channels should be input to that mixing bus. Thus, the mixer section disclosed in Patent Literature 2 can achieve an extremely high degree of freedom.

However, the technique disclosed in Patent Literature 1, where the numbers of the channels and mixing buses are fixed, can not flexibly meet user's requests, such as 1) a request that the number of the channels be increased although the number of the mixing buses may be decreased, 2) a request that the adjustment processing per channel be made more complicated with the number of the channels decreased and 3) a request that the number of the mixing buses be increased. Similar inconvenience is encountered in a case where mixing processing is implemented through operation of fixed microprograms; to meet the above-mentioned request, it is necessary remake the microprograms.

In the case where arrangements are made to permit designation of input and output channels per mixing channel as disclosed in Patent Literature 2, there can be achieved a higher degree of freedom as a mixer, separate registers are required for setting input and output channels per mixing channel and settings have to be performed on all of these registers, which would complicate processing for managing the mixer section.

As regards algorithms of mixing processing performed in ordinary digital mixers, an output point at which an audio signal is to be output from an input channel to a mixing bus varies (e.g., by pre-fader/post-fader switching), but an input point at which an audio signal is to be input from a mixing bus to an output channel is fixed. Therefore, in order to implement such mixing processing, it is not essential to permit designation of an output destination per mixing channel.

In some cases, mixing apparatus are designed which differ from each other in the number of input channels, content of processing performed in the input channels, number of mixing buses, etc. in accordance with their requested specifications. However, the conventional DSPs can not meet such various requirements. Besides, with the conventional DSPs, which audio transmission terminals are to be used for what purposes and which audio reception terminals are to be used for what purposes are not decided in advance. Thus, in a case where mixing processing is performed cooperatively by a plurality of DSPs, it has been necessary to allocate content of the mixing processing to be implemented to the individual DSPs with audio signal transfer between the DSPs taken into account. Thus, designing of a circuit board and processing programs tends to be very complicated.

In a case where a plurality of DSPs are to be interconnected in such a manner that desired signal transfer can be achieved using serial I/Os, the connection tends to be complicated like a puzzle, which would lead to very difficult designing. On the other hand, interconnecting a plurality of DSP in such a manner that desired signal transfer can be achieved using audio bus I/Os is not so difficult; however, using audio buses of high general versatility in order to increase the number of channels is very wasteful and inefficient.

Further, in a case where a plurality of DSPs are interconnected in a cascade fashion (i.e., "cascade-connected"), a signal received in a given sampling period is mixed with outputs of the individual DSPs in the next sampling period and then output to the next DSP in the still next sampling period. Therefore, a signal received in a given DAC period can not be output to the next DSP in the next DAC period. Namely, in the case where a plurality of DSPs are cascade-connected so that an audio signal is sequentially transferred between the DSPs, a time delay of a length equal to at least two sampling periods would be produced in the signal per DSP. In recent business-use audio equipment, requested specifications to strictly eliminate undesired sample displacements are sometimes required, and thus, there is a need to minimize a time delay per DSP in the case where a plurality of DSPs are cascade-connected.

Generally, in the case where mixing apparatus are designed which differ in the number of input channels, content of processing performed in the input channels, number of mixing buses, etc. in accordance with their requested specifications, as noted above, the conventional DSPs would present the problem that they can not flexibly meet the various requirements by the DSPs being just simply interconnected. Particularly, the conventional DSPs can not properly meet a request for strictly eliminating undesired sample displacements.

Further, the conventional signal processing integrated circuits as discussed above contain a plurality of blocks, such as an input block, output block and signal processing block. In a case where signals are to be transferred from one of the blocks to another, it has been conventional to provide fixed connection wiring corresponding to a transfer path of the signals, which however tends to be very inefficient. It is conceivable to replace such fixed connection wiring with a block-to-block (inter-block) communicating memory, in which case, however, the communicating memory has to be a high-speed memory because it receives write accesses and read accesses from a plurality of blocks. In addition, a frequency band width necessary for the communicating memory increases as the number of the blocks, constituting the integrated circuit, increases, which would make designing of the integrated circuit more difficult.

SUMMARY OF THE INVENTION

In view of the foregoing, it is an object of the present invention to provide a novel technique of a digital signal processing apparatus for mixing digital audio signals which can be appropriately applied to mixer apparatus of various requested specifications, can simplify designing of a signal-processing circuit board for a mixer apparatus employing a plurality of DSPs, and can facilitate designing of processing programs to be executed by the individual DSPs.

It is another object of the present invention to provide a novel technique of a digital signal processing apparatus for mixing or the like which allows a signal to be readily transferred from one block to another via a communicating memory in a signal-processing integrated circuit board including a plurality of blocks, such as an input block, output block and signal processing block, which does not require a memory of a very high speed as the communicating memory, and which can facilitate designing of the integrated circuit.

In order to accomplish the above-mentioned objects, the signal processing integrated circuit according to one aspect of the present invention allows a user to designate a desired mode that defines respective desired numbers of channels and mixing buses, and it repetitively performs processing for mixing input signals of the number of channels corresponding to the designated mode to thereby generate mixed signals via the individual buses. For that purpose, the time point of arrival of the last step in the mixing processing for the number of channels, corresponding to the designated mode, is detected to output an accumulation result obtained at the last step, and new accumulation is started with a digital audio signal inputted at a step following the last step.

Further, in the present invention, there are provided first and second signal processing sections. The first signal processing section performs signal processing on the basis of microprograms and thereby outputs digital audio signals of the number of channels, corresponding to the mode designated by the mode designation section, to the second signal processing section. The second signal processing section then performs mixing processing on the digital audio signals of the number of channels a predetermined number of times equal to a quotient of (predetermined number of product-sum calculations) divided by (number of channels), and thereby outputs a given number of digital audio signals which is equal to the quotient. More specifically, one desired mode can be designated from among at least two modes including "mode 1" in which the numbers of channels and mixing buses are J1 and K1, respectively, and "mode 2" in which the numbers of channels and mixing buses are J2 and K2, respectively, where J1×K1=J2×K2=H. Thus, the number of channels to be subjected to the signal processing and the number of mixing buses that are used for the mixing can be set/changed in accordance with the designated mode.

In the present invention, the combination of the numbers of channels and buses involved in the mixing processing to be performed by the mixing signal processing circuit can be changed in accordance with one piece of mode information. Unlike the prior art, it is not necessary to designate, per product-sum calculation processing of each step, an audio signal of which channel is to be inputted and then added to (mixed with) an audio signal of which bus. Further, because the first signal processing section capable of performing desired processing and the second signal processing section capable of performing mixing processing where the numbers of channels and mixing buses are changeable are constructed as a one-chip integrated circuit, the present invention allows the number of channels to be readily increased/decreased in accordance with the signal processing to be performed per channel and also allows the number of mixing buses to be readily changed in accordance with the increase/decrease in the number of channels. Further, using a same-type integrated circuit, it is possible to design any desired one of a mixer where the signal processing amount per channel is great (although the number of channels is small) while the number of mixing buses is great, and a mixer where the number of channels is great (the signal processing amount per channel is small) while the number of mixing buses is small. Thus, the present invention can be applied to mixer apparatus of various requested specifications and can greatly facilitate designing of a signal-processing integrated circuit board for a mixer apparatus employing a plurality of DSPs. Further, the present invention can provide a novel technique of a mixing digital signal processing apparatus which can facilitate designing of processing programs to be executed by the individual DSPs.

Further, according to the second aspect of the present invention, there is provided a mixing signal processing apparatus including cascade-connected first and second signal processing circuits, which is characterized by novel arrangements for cascade-transferring digital audio signals from the first signal processing circuit to the second signal processing circuit. The first signal processing circuit performs processing of a predetermined number of steps in each sampling period, and stores a plurality of resultant processed digital audio signals into a storage section. For each of the steps, the first signal processing circuit transmits the stored digital audio signal to the second signal processing circuit via a cascade output section. The second signal processing circuit adds a digital audio signal, processed for each of the steps, to the digital audio signal received from the first signal processing circuit via a cascade input section and then writes the result of the addition into its storage section. The mixing signal processing apparatus also includes a mode designation section that designates a mode defining numbers of channels and mixing buses, so that the aforementioned cascade transfer is performed for each of the steps that correspond to the number of channels corresponding to the designated mode.

Further, the present invention is characterized by a mixing signal processing integrated circuit equipped with the aforementioned cascade transfer arrangements. Signal processing section for a mixer apparatus can be constructed with ease by cascade-connecting a plurality of such mixing signal processing integrated circuits.

When a digital audio signal is to be transferred from the first signal processing circuit to the second signal processing circuit via a cascade transfer path, the present invention can reduce a time delay of the digital audio signal processed by the second signal processing relative to the digital audio signal transferred by the first signal processing circuit to a length equal to one sampling period; with the prior art discussed above, the time delay use to be of a length equal to two sampling periods. Further, the number of digital audio signals to be transferred via the cascade transfer path (i.e., the number of mixing buses) can be changed in accordance with a designated mode, in which case too the above-mentioned time delay can be of a reduced length equal to just one sampling period. Thus, the present invention can be applied to mixer apparatus of various requested specifications and can greatly facilitate designing of a signal-processing integrated circuit board for a mixer apparatus employing a plurality of DSPs. Further, the present invention can provide a novel technique of a mixing digital signal processing apparatus which can facilitate designing of processing programs to be executed by the individual DSPs.

According to the third aspect of the present invention, there is provided a mixing apparatus comprising a plurality of cascade-connected signal processing integrated circuits. Each of the signal processing integrated circuits comprises: an adjustment processing section that that, every sampling period, performs signal processing of a predetermined number of steps on externally-inputted digital audio signals on the basis of microprograms and thereby outputs processed digital audio signals; a reception section that receives, from a preceding-stage signal processing integrated circuit if any, digital audio signals of a predetermined number of buses; a mixing processing section that inputs the digital audio signals of a predetermined number of channels, corresponding to the designated mode, from the adjustment processing section, performs mixing processing, via the predetermined number of buses corresponding to the designated mode, for mixing the inputted digital audio signals of the predetermined number of channels from the adjustment processing section and the individual digital audio signals received via the reception section, and thereby outputs mixed digital audio signals of the predetermined number of buses; and a transmission section that transmits, to a succeeding-stage signal processing integrated circuit if any, the mixed digital audio signals of the predetermined number of buses outputted by the mixing processing section. Here, the number of input channels in the mixing processing apparatus depends on the number of the cascade-connected signal processing integrated circuits.

Further, the present invention may include a mode designation section that designates a mode defining respective numbers of channels and mixing buses. The reception section receives, from a preceding-stage signal processing integrated circuit if any, digital audio signals of a predetermined number of buses corresponding to the designated mode. The mixing processing section inputs, from the adjustment processing section, the digital audio signals of a predetermined number of channels corresponding to the designated mode, performs mixing processing, via predetermined number of buses corresponding to the designated mode, for mixing the inputted digital audio signals of the predetermined number of channels from the adjustment processing section and the individual digital audio signals received via the reception section, and thereby outputs mixed digital audio signals of the predetermined number of buses. The transmission section transmits, to a succeeding-stage signal processing integrated circuit if any, the digital audio signals of the predetermined number of buses outputted by the mixing processing section. In this case, the number of input channels in the mixing processing apparatus depends on the mode designated by the designation section and the number of the cascade-connected signal processing integrated circuits.

In the mixing processing apparatus according to the present invention, signal processing integrated circuits ("MLSIs" in embodiments to be later described) corresponding to a desired number of input channels are fabricated on a printed circuit board, and a signal processing block of the mixing processing apparatus can be constructed by just connecting output terminals of the transmission section of a preceding-stage signal processing integrated circuit with input terminals of the reception section of a succeeding-stage signal processing integrated circuit in a desired pattern. Thus, the present invention can extremely simplify designing of the printed circuit board and signal processing to be executed by the individual signal processing integrated circuits and thus significantly shorten a necessary development period. Further, according to the present invention, a signal processing block of a mixing processing apparatus having desired numbers of input channels and buses can be provided by fabricating signal processing integrated circuits, corresponding to the desired numbers of input channels and buses, connecting output terminals of the transmission section of a preceding-stage signal processing integrated circuit with input terminals of the reception section of a succeeding-stage signal processing integrated circuit in a desired pattern and setting a mode, corresponding to the desired number of buses, in each of the signal processing integrated circuits. Thus, the present invention can extremely simplify designing of the printed circuit board and signal processing to be executed by the individual signal processing integrated circuits and thus significantly shorten a necessary development period. In this way, the present invention can be applied to mixer apparatus of various requested specifications and can greatly facilitate designing of a signal-processing integrated circuit board for a mixer apparatus employing a plurality of DSPs. Further, the present invention can provide a technique of a mixing digital signal processing apparatus which can facilitate designing of processing programs to be executed by the individual DSPs.

According to the fourth aspect of the present invention, there is provided a signal processing integrated circuit, which comprises: a plurality of blocks including: an input block that supplies input signals from outside; an output block that outputs the signals, supplied by the input block, to outside; and a signal processing block that processes the supplied signals to thereby supply processed signals; and a plurality of communicating memories corresponding to a plurality of transfer paths between the blocks, each of the communicating memories including a data-writing front-side memory (area) and a data-reading back-side memory (area), the data-writing front-side memory and the data-reading back-side memory being used alternately every sampling period. At desired timing in each sampling period, any one of the blocks at a transmitting end, which intends to transfer signals to another of the blocks, writes the signals into the front-side memory of the communicating memory, having the other block as a transfer destination thereof, of a plurality of the communicating memories having the transmitting-end block as a transfer source thereof, and any one of the blocks at a receiving end, which intends to receive signals from another of the blocks, reads the signals from the back-side memory of the communicating memory, having the other block as a transfer source thereof, of the plurality of the communicating memories having the receiving-end block as a transfer destination thereof.

Preferably, the signal processing integrated circuit includes a plurality of the signal processing blocks, and the plurality of transfer paths include a transfer path between the signal processing blocks.

In the signal processing integrated circuit of the present invention, provided with the plurality of blocks including the signal processing block, signals can be readily transferred from one block to another via the communicating memory. Accesses for writing into the front-side memory and for reading out from the back-side memory of each of the communicating memories are limited to those by a corresponding transfer-source (i.e., transferred-from) block and corresponding transfer-destination (i.e., transferred-to) block, and thus, no access from the other blocks is permitted. Therefore, even if the number of signal transfer paths is increased, the necessary frequency band of each of the communicating memories can be lowered. Namely, there is no need for the communicating memories to be very-fast memories, and designing of the circuits is not so difficult. Further, with the communicating memories used on signal transfer paths between the plurality of signal processing blocks, it is possible to transfer signals from one signal processing block to another signal processing block within the signal processing integrated circuit.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION

Figures 1A, 1B:
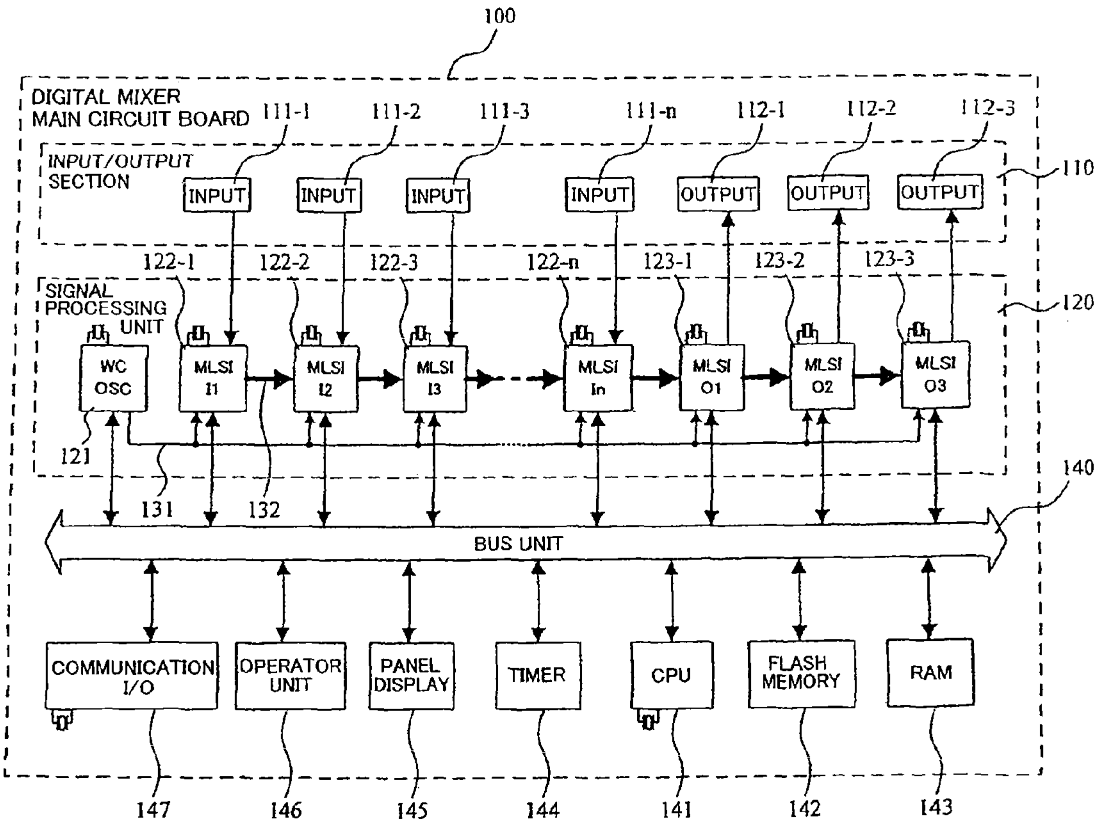
FIG. 1A is a block diagram showing a general setup of circuitry of a digital mixer apparatus according to an embodiment of the present invention.
FIG. 1B is a diagram showing relationship between modes and respective numbers of input channels and mixing buses.

FIG. 1A is a block diagram showing an example general setup of circuitry formed on a main board 100 of a digital mixer apparatus according to an embodiment of the present invention. The present invention concerns a mixing processing circuit formed on a printed board. The mixer apparatus shown in FIG. 1A includes a central processing unit (CPU) 141, a flash memory 142, a random access memory (RAM) 143, a timer 144, a panel display 145, an operator unit 146, a communication input/output (I/O) interface 147, a signal processing section 120, and an input/output unit 110. The components 141-147 and signal processing unit 120 are connected to a bus unit 140 so that various data can be communicated among them. The bus unit 140 includes a control bus, data bus and address bus.

The signal processing unit 120 includes a word clock oscillator 121, and MLSIs **122-1-122-*n* and 123-1-123-3 characterizing the embodiment. The MLSIs 122-1-122-*n* ("MLSI I1-MLSI In") are each a one-chip DSP that performs input-side processing, such as input channel adjustment processing and mixing processing performed via mixing buses. The MLSIs 123-1-123-3 ("MLSI O1-MLSI O3") are each a one-chip DSP that performs output-side processing, such as output channel adjustment processing. The input-side MLSIs 122-1-122-*n* and output-side MLSIs 123-1-123-3 are implemented by integrated circuits of a same type. The integrated circuits will hereinafter be referred to simply (generically) as "MLSIs". The input/output unit 110 includes input sections 111-1-111-*n* that are interfaces for inputting digital audio signals from the outside to the respective input-side MLSIs 122-1-122-*n*, and output sections 112-1-112-3 that are interfaces for outputting digital audio signals from the respective output-side MLSIs 123-1-123-3** to the outside.

The CPU 141 is a processing device for controlling behavior of the entire mixer apparatus. The flash memory 142 is a non-volatile memory having stored therein various programs to be executed by the CPU 141 and various data. The RAM 143 is a volatile memory that are used as a load area for a program to be executed by the CPU 141 and as a working area for the CPU 141. The timer 144 is used to generate a time interrupt signal to be given to the CPU 141. The panel display 145 is provided, on an operation panel of the mixer apparatus, for displaying various information. The operator unit 146 includes operator members, such as various switches, knobs and faders, provided on the operation panel. The communication I/O interface 147 is an interface for connecting the mixer apparatus to external equipment, such as a PC (personal computer).

The word clock oscillator 121 in the signal processing unit 120 generates a word clock (i.e., clock signal of a predetermined sampling frequency) WC that functions as a reference timing signal to be used when a digital audio signal is to be processed. Generally, digital mixers are constructed to process a signal in synchronism with a word clock given from external equipment, and so is the instant embodiment of the mixer apparatus. The word clock oscillator 121 includes a PLL (Phase Locked Loop) circuit provided therein so that a word clock WC, synchronized with a word clock given from external equipment, can be generated stably and supplied to the MLSIs **122-1-122-*n* and 123-1-123-3. In a case where no word clock is supplied from external equipment, the word clock oscillator 121 may generate a word clock WC by it self. Reference numeral 131** indicates a supply line for supplying the same word clock WC to all of the MLSIs. In the following description, it is assumed that the sampling frequency is 48 kHz.

The input/output unit 110 is a circuit for inputting/outputting analog and digital audio signals. In each of the MLSIs, there are provided respective interfaces for an A/D (Analog/Digital) converter, D/A (Digital/Analog) converter, audio bus ("A bus") and serial bus. Thus, input/output of analog audio signals is permitted by just providing an A/D converter in each of the input sections **111-1-111-*n* and providing a D/A converter in each of the output sections 112-1-112-3. Audio bus I/O is provided in each of the input sections 111-1-111-*n* and output sections 112-1-112-3, and the input sections 111-1-111-*n* and output sections 112-1-112-3 are connected to the corresponding MLSIs 122-1-123-3** via the audio buses ("A buses").

Each of the MLSIs includes a plurality of digital audio input terminals. The plurality of digital audio input terminals of "MLSI I1", for example, are connected with lines (input ports) of the input section 111-1 for inputting a plurality of channels of digital audio signals output from the input section 111-1; the plurality of digital audio input terminals of the other input-side MLSIs are connected with the corresponding input sections in a similar manner. Each of the MLSIs includes a plurality of digital audio output terminals. The plurality of digital audio output terminals of "MLSI O1", for example, are connected with output ports of a plurality of channels of digital audio signals of the output section 112-1; the plurality of digital audio output terminals of the other output-side MLSIs are connected with the corresponding output sections in a similar manner. The following paragraphs outline functions of the MLSIs.

Each of the MLSIs contains therein a DSP (NDSP) for ordinary processing and a DSP (MDSP) for mixing processing. The NDSP performs arithmetic processing of microprograms of 3,072 steps in one sampling period and repeats such arithmetic processing every sampling period. The CPU 141 sets the microprograms of 3,072 steps in each of the MLSIs to cause the MLSI to perform adjustment processing on a plurality of input channels if the MLSI is an input-side MLSI, or to perform adjustment processing on a plurality of output channels if the MLSI is an output-side MLSI. The MDSP performs product-sum calculations of 3,072 steps in one sampling period and repeats such product-sum calculations every sampling period. The MDSP performs the product-sum calculations by operating in accordance with control signals generated via a hardware logic circuit without the microprograms being set in the MDSP. The MDSP uses the 3,072 steps to perform the mixing processing for adding or mixing an audio signal of each of the channels, adjusted by the MLSI in question, to a plurality of mixing buses (i.e., with audio signals of the plurality of mixing buses).

Each of the MLSIs is an integrated circuit having a general versatility, which contains therein a mode register and can change the numbers of input channels and mixing buses, which are to be processed by the MLSI, by changing a mode value set in the mode register. FIG. 1B shows relationship between the mode and the numbers of input channels and mixing buses in the MLSI. Let it be assumed here that a same mode is set in all of the MLSIs within the signal processing unit 120 of the mixer apparatus. In the illustrated example of FIG. 1A, a same mode is set in all of "MLSI I1"-"MLSI In" and "MLSI O1"-"MLSI O3". If "mode 1" is set in these MLSIs, "MLSI I1"-"MLSI In" (n input-side MLSIs) can process a total of "32 channels×n" inputs because each of the input-side MLSIs can input audio signals of 32 channels and perform the adjustment processing on the input audio signals of 32 channels. Similarly, if "mode 2" is set in the MLSIs, "MLSI In" (n input-side MLSIs) can process a total of "64 channels×n" inputs, or if "mode 3" is set in the MLSIs, "MLSI In" (n input-side MLSIs) can process a total of "48 channels×n" inputs.

Each of the MLSIs includes a cascade input terminal and cascade output terminal. In the illustrated example of FIG. 1A, cascade connection is made up to the last-stage MLSI ("MLSI O3") by the cascade output terminal of "MLSI I1" being connected to the cascade input terminal of next "MLSI I2", the cascade output terminal of "MLSI I2" being connected to the cascade input terminal of next "MLSI I3" and so on. Arrow 132 indicates cascade connection lines for cascade transmission or transfer from "MLSI I1" to "MLSI I2"; other arrows indicate similar cascade connection lines between the adjoining MLSIs. Through such cascade transfer, transfer of audio signals of the plurality of mixing buses is achieved. In the case where the currently-set mode is "mode 1", for example, the number of the mixing buses is 96 as seen in FIG.

1B, and thus, audio signals of the 96 mixing buses (hereinafter referred to as "mixing bus 0"-"mixing bus 95") are sequentially transferred, through the MLSI-to-MLSI case transfer, on a time-divisional basis per sampling period.

Specific manners in which the mixing and cascade transfer are performed in the instant embodiment are as follows. (1) First, in leading "MLSI I1", the MDSP mixes audio signals of input channels, having been subjected to the adjustment processing in "MLSI I1", to provide a mixing result to be mixed to (i.e., mixed with a signal of) "mixing bus 0" and then cascade-transfers the result of the mixing of "mixing bus 0" to next "MLSI I2" as a mixed signal of "mixing bus 0". Then, the MDSP mixes the audio signals of the input channels, having been subjected to the adjustment processing in "MLSI I1", to provide a mixing result to be mixed to (i.e., mixed with a signal of) "mixing bus 1" and then cascade-transfers the mixing result of "mixing bus 1" to next "MLSI I2" as a mixed signal of "mixing bus 1". Then, in a similar manner to the aforementioned, the MDSP sequentially transfers respective mixed audio signals of the other mixing buses (up to "mixing bus 95") to "MLSI I2". "MLSI I1" repeats the cascade transfer of mixed audio signals of "mixing bus 0"-"mixing bus 95" every sampling period. (2) In next "MLSI I2", the MDSP mixes audio signals of input channels, having been subjected to the adjustment processing in "MLSI I2", to provide a mixing result to be mixed to (i.e., mixed with a signal of) "mixing bus 0" and then cascade-transfers the mixing result of "mixing bus 0" to next "MLSI I3" as a mixed signal of "mixing bus 0". Then, the MDSP mixes the audio signals of the input channels, having been subjected to the adjustment processing in "MLSI I2", to provide a mixing result to be mixed to "mixing bus 1" and then cascade-transfers the mixing result of "mixing bus 1" to next "MLSI I3" as a mixed signal of "mixing bus 1". Then, in a similar manner to the aforementioned, the MDSP sequentially transfers respective mixed audio signals of the other mixing buses (up to "mixing bus 95") to "MLSI I3". "MLSI I2" repeats the cascade transfer of mixed audio signals of "mixing bus 0"-"mixing bus 95" every sampling period. (3) In each of "MLSI I3"-"MLSI In-1", operations similar to those in "MLSI I2" are performed. What are ultimately cascade-transferred from the last-stage input-side MLSI (i.e., "MLSI In") to the leading output-side MLSI (i.e., "MLSI O1") are the results of mixing (mixed signals) of the predetermined number of the mixing buses corresponding to the currently-set mode. From the foregoing, it may be understood that the predetermined number of the mixing buses defined by the currently-set mode are provided on the cascade transfer lines connecting between the MLSIs; thus, the individual mixing buses on the cascade transfer lines will hereinafter be referred to as "mixing bus channels".

Each of output-side "MLSI O1"-"MLSI O3" takes out the cascade-transferred signals of the individual mixing bus channels, performs adjustment processing on the taken-out signals in the output channels provided within the MLSI and then supplies output signals of the individual output channels to the output sections 112-1-112-3. Note that the relationship between the mode and the number of input channels illustrated in FIG. 1B is relationship for the "number of input channels" when the MLSI in question is used on the input side (i.e., as an input-side MLSI). The number of output channels when the MLSI in question is used on the output side is chosen arbitrarily without being bounded by the relationship of FIG. 1B. Namely, the number of output channels that can be processed at 3,072 steps performed by the NDSP can be set arbitrary. Assuming that the currently-set mode in all of the input-side MLSIs is "mode 1" in FIG. 1A, it is appropriate that, on the output side too, each of the MLSIs be constructed to realize about 32 output channels; thus, in the instant embodiment, signals of the 96 mixing bus channels are allocated to the three output-side MLSIs, 32 mixing bus channel per output-side MLSI, so that the mixed signals are output after having been subjected to the adjustment processing on the respective output channels.

As set forth above, each of the MLSIs in the instant embodiment is an integrated circuit having a general versatility such that the numbers of input channels and mixing buses to be processed by the MLSI can be changed by changing the mode to be set. Generally, in designing a mixer apparatus, the numbers of input channels and mixing buses are determined in accordance with the specifications of the mixer apparatus (e.g., scale or size of the mixer apparatus), and arrangements have to be made such that a signal of any desired input channel can be mixed to (i.e., mixed with a signal of) a desired mixing bus. In each of the MLSIs in the instant embodiment, the number of mixing buses is determined in accordance with the mode, and mixing bus channels, over which audio signals of that number of mixing buses flow, are set on the cascade transfer lines. Further, in each of the input-side MLSIs, an audio signal from any desired input channel can be mixed to any desired mixing bus channel on the cascade transfer lines so that the audio signal from the desired input channel is mixed with a signal of the desired mixing bus. Desired number of input channels can be secured in the entire mixer apparatus by changing the total number of input-side MLSIs, i.e. by changing the value of "n" of "MLSI I1-MLSI In". Therefore, with the MLSIs in the instant embodiment, it is possible to readily design a mixer apparatus of a desired scale.

Further, in each of the MLSIs in the instant embodiment, the adjustment processing on the input and output channels and the like are performed by the MLSI executing desired operations, as designed by a human designer, using microprograms (as will be later detailed in relation to FIG. 7). The mixing processing, on the other hand, is performed by the MLS executing mechanical repetitive operations using a hardware logic circuit (as will be later detailed in relation to FIG. 8). Thus, there is no need for the human designer to code microprograms for the mixing processing.

Figure 2:
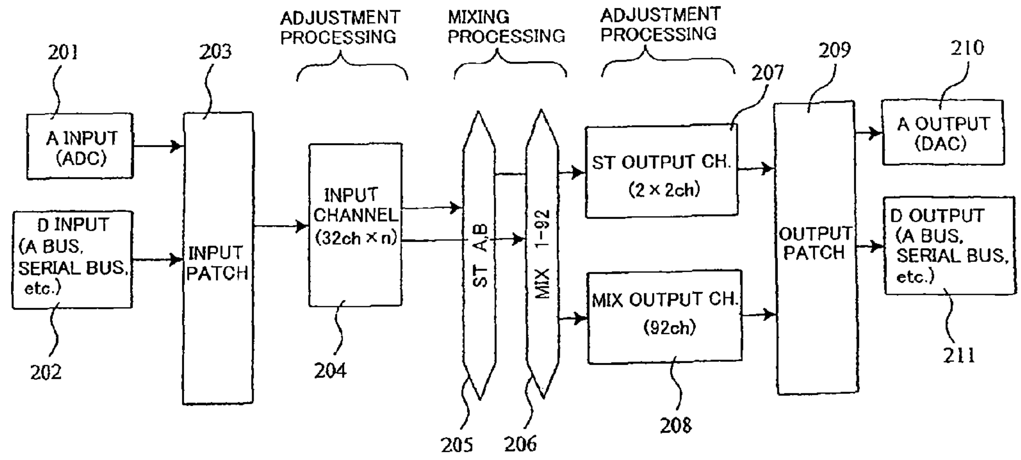
FIG. 2 is a block diagram explanatory of an example functional construction of mixer processing implemented by the digital mixer apparatus shown in FIG. 1A.

FIG. 2 is a block diagram showing an example functional construction of the mixer processing implemented primarily by the signal processing unit 120 and input/output unit 110 of the digital mixer apparatus shown in FIG. 1A. "A input" section 201 is a section for inputting analog audio signals received via a microphone and/or signal line and converting the input analog audio signals into digital representation via an A/D converter. "D input" section 202 is a section for inputting digital audio signals input via any of various digital communication lines, such as AES/EBU (trademark), ADAT (trademark) and CobraNet (trademark). The A input section 201 and D input section 202 are blocks implemented by the input sections 111-1-111-*n*. Input channel section 204 is a block for performing the adjustment processing on the input signals (as will be later detailed in relation to FIG. 3), and this block is implemented by the NDSPs provided in input-side "MLSI I1"-"MLSI In". "32ch×n" in the block of the input channel section 204 indicates that the total number of input channels in the entire digital mixer apparatus is "32ch×n" when "mode 1" is set in all of input-side "MLSI I1"-"MLSI In" shown in FIG. 1A. Input patch section 203 is a block for connecting the individual input ports of the A input section 201 and D input section 202 with the input channels of the input channel section 204, and this input patch section 203*b* is implemented by the audio buses connecting the input sections 111-1-111-*n* and input-side "MLSI I1"-"MLSI In" of FIG. 1A and the audio bus I/Os.

Signals of desired input channels of the input channel section 204 are selectively output to desired mixing buses (MIX and ST (stereo) buses of MIX and ST bus sections 206 and 205), where the signals are subjected to the mixing processing. This mixing processing is implemented by the mixing processing and cascade transfer functions of the MDSPs of input-side "MLSI I1"-"MLSI In" shown in FIG. 1A. The "mixing bus channels" described above in relation to FIG. 1 can be regarded as corresponding to the MIX and ST buses 206 and 205. Because it is assumed here that the currently-set mode is "mode 1", a total of 96 mixing buses are provided by 92 MIX buses ("MIX 1"-"MIX92") 206 and four ST buses consisting of stereo-A left and right (L and R) buses and stereo-B left and right (L and R) buses. "mixing bus 0"-"mixing bus 91" correspond to "MIX 1"-"MIX92", respectively, and "mixing bus 92"-"mixing bus 95" correspond to stereo-A left and right buses and stereo-B left and right buses, respectively.

Results of the mixing by the mixing bus channels 206 and 205 are output to a corresponding MIX output channel section 208 (92 channels) and ST output channel section 207 (2×2 channels), where they are subjected to output-side adjustment processing. Output signals from these output channel sections 207 and 208 are delivered, via an output patch section 209, to output ports of an A (analog) output section 210 and digital (D) output section 211. The A output section 210 is a block for converting the delivered digital audio signals into analog representation via a D/A converter and outputting the converted analog audio signals to the outside. The D output section 211 is a block for outputting the delivered digital audios signal as-is (i.e., in the digital representation) via any of various digital communication lines, such as AES/EBU (trademark), ADAT (trademark) and CobraNet (trademark). The output patch section 209 is a block for connecting the channels of the output channel sections 207 and 208 with the output ports of the A output section 210 and D output section 211. The output-side adjustment processing in the output channel sections 207 and 208 is implemented by output-side "MLSI O1"-"MLSI O3", and the output patch section 209 is implemented by the audio buses connecting output-side "MLSI O1"-"MLSI O3" with the output sections 112-1-112-3 and the audio bus I/Os. The A output section 210 and D output section 211 are blocks implemented by the output sections 112-1-112-3 shown in FIG. 1A.

Figure 3:
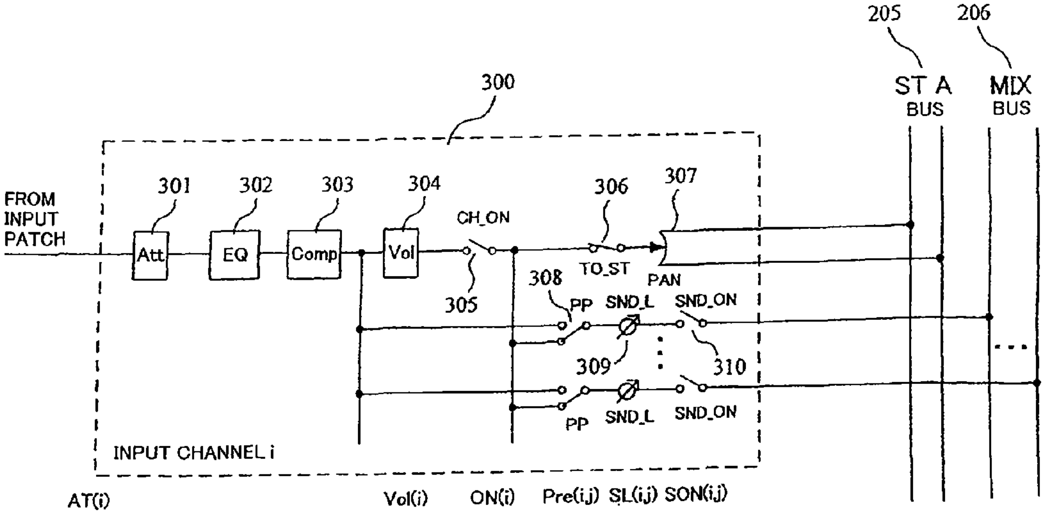
FIG. 3 is a block diagram showing an example functional construction of an input channel.

FIG. 3 is a block diagram showing an example functional construction of a representative one of the channels of the input channel section 204 shown in FIG. 2. As shown, the input channel 300 includes an attenuator (ATT) 301, equalizer (EQ) 302, compressor (Comp) 303, volume control (Vol) 304, channel-ON switch (CH_ON) 305, stereo-ON switch (TO_ST) 306, panning adjuster (PAN) 307, pre/post switch (PP) 308, send level adjusters (SND_L) 309, and send-ON switches (SND_ON) 310.

The attenuator 301 performs level control at a leading end portion of the input channel 300. The equalizer 302 performs a frequency characteristic adjustment process, and the compressor 303 performs an automatic gain adjustment process. The volume control 304 performs a signal level adjustment process. The channel-ON switch 305 is a switch for turning on or off the signal output of the input channel 300, and the stereo-ON switch 306 is a switch for turning on or off the signal output of the input channel 300 to the ST bus section 205. The panning adjuster 307 adjusts balance between left and right stereo signals. The pre/post switch 308 is provided for, when the signal of the input channel 300 is to be output to one of the MIX buses 206, switching between a pre-fader position for taking out the signal of the input channel 300 at a point preceding the volume control 1304 and a post-fader position for taking out the signal of the input channel 300 at a point following the volume control 1304. The send level adjusters 309 each adjust a send level at which the signal is to be sent or delivered to any one of the individual MIX buses 206. The send-ON switches 310 are each a switch for turning on/off delivery of the signal to any one of the individual MIX buses 206. Whereas FIG. 3 shows only the stereo A buses of the ST bus section 205, the stereo B buses are constructed in a similar manner to the stereo A buses. Further, all of the mixing buses MIX1-MIX92 are constructed in a similar manner to the stereo buses. Therefore, an output signal of any one of the input channels can be mixed to any desired one of the mixing buses. Whereas only the construction of the input channels has been described above in relation to FIG. 3, the output channels are generally similar in functional construction to the input channels.

Of the functional construction of the aforementioned input channel, the operations other than the multiplication operations immediately preceding the mixing by the mixing buses 205 and 206, i.e. the operations indicated at 301-305 in the figure, are implemented by execution of microprograms by the NDSP of the MLSI. To put it the other way around, the functional construction can be set as desired per input channel by changing the microprograms to be executed by the NDSP.

The multiplication operations immediately preceding the mixing by the mixing buses 205 and 206 and the accumulation to the mixing buses 205 and 206 are carried out by the MDSP of the MLSI. Specifically, two memory regions for writing therein results of the input-side adjustment processing (i.e., memory regions secured in "Mram1" to be later described in relation to FIG. 6 and the like) are allocated in advance per channel (the two memory regions will be referred to as "first address" and "second address"). The NDSP writes the result of the process by the compressor (Comp) 303 (i.e., data at the pre-fader position) into the first address and writes the result of the process by the channel-ON switch (CH_ON) 305 (i.e., data at the post-fader position) into the second address. Because, as will be later detailed, the mixing processing performed by the MDSP is arranged to mix signals read out with read addresses designated on a step-by-step basis (i.e., step-by-step read addresses set in a read address memory 803 to be later described in relation to FIG. 8), the pre/post switch (PP) 308 is implemented by setting the read address of each of the channels into the first or second address in accordance with a pre-fader/post-fader setting, per mixing bus, of that channel. For each of the ST buses 205 of the mixing buses, it is only necessary for the MDSP to read out the signal from the second address. Further, settings of the send level adjuster (SND_L) 309 and send-ON switch (SND_ON) 310 for each of the MIX buses 206 and settings of the stereo-ON switch (TO_ST) 306 and panning adjuster (PAN) 307 for each of the ST buses 205 are combined with coefficients that are to be used when the signal of the channel in question (i.e., predetermined coefficients set in the coefficient memory 802 to be later described in relation to FIG. 8) is to be supplied or mixed to each of the mixing buses for mixing processing, and thus, the aforementioned processing is completed by the coefficient multiplication being performed only once by the MDSP; namely, the coefficient multiplication by the send level adjuster (SND_L) 309 and ON/OFF control by the send-ON switch (SND_ON) 310, for example, can be effected by only one coefficient multiplication.

Figure 4:
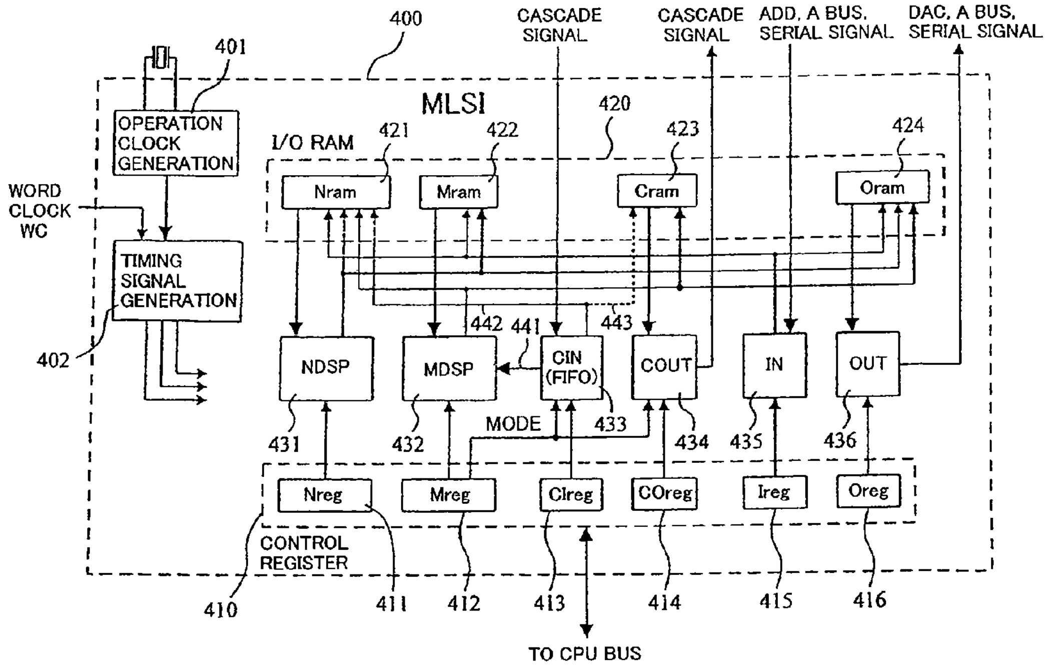
FIG. 4 is a block diagram showing an example internal construction of an MLSI shown in FIG. 1A.

FIG. 4 is a block diagram showing an example internal construction of a representative one of the MLSIs shown in FIG. 1A. The MLSI 400 includes an operation clock generation section 401, timing signal generation section 402, control register 410, ordinary or normal processing DSP (NDSP) 431, mixing processing DSP (MDSP) 432, cascade input section (CIN) 433, cascade output section (COUT) 434, input section (IN) 435, output section (OUT) 436 and I/O RAM 420. The control register 410 includes an N register (Nreg) 411, M register (Mreg) 412, CI register (CIreg) 413, CO register (COreg) 414, I register (Ireg) 415 and O register (Oreg) 4116. The I/O RAM 420 includes an Nram 421, Mram 422, Cram 423 and Oram 424. The I/O RAM 420 is a storage area to be used for data transfer between the individual processing sections 431-436 (as will be later described in relation to FIG. 6). Particularly, data written in the Cram 423 is cascade-transferred, via the cascade output section 436, to the next (i.e., succeeding-stage) MLSI, and thus, the Cram 423 is a cascade-transferring storage area. Further, data written in the Oram 424 is transferred, via the output section 436, to the output section 112-1-112-3, and thus, the Oram 424 is a data-outputting storage area.

Each of the above-mentioned sections or blocks of the MLSI 400 will now be described. The operation clock generation section 401 generates local operation clock signals (frequency of which is, for example, 166 MHz) to be used in the MLSI 400. The timing signal generation section 402 supplies timing signals necessary for the individual blocks in the MLSI 400 to operate. The individual blocks in the MLSI 400, including the NDSP 431, MDSP 432 and cascade output section (COUT) 434, operate at timing responsive to the timing signals supplied from the timing signal generation section 402. Note that, because each of the plurality of MLSIs shown in FIG. 1A operates independently in response to the operation clocks generated by the operation clock generation section 401 provided in that MLSI, there may occur timing differences among the operation clocks of the MLSIs. However, because the same word clocks WC are supplied to all of the MLSIs and the timing signal generation section 402 in each of the MLSIs generates timing signals having been subjected to timing adjustment such that one DAC period (one sampling period) starts at the timing indicated by the word clock WC, it is ensured that the start timing of each DAC period coincides among the MLSIs.

As outlined in relation to FIGS. 1A and 1B, the NDSP 431 is a DSP that performs the adjustment processing in the input channel 204 or output channel 207 or 208. The Nreg 411 is a register for setting microprograms of 3,072 steps to be executed by the NDSP 431 every sampling period and coefficient t data to be used for each of the steps. In the case where the MLSI in question is used on the input side (i.e., as an input-side MLSI), the CPU 141 sets, into the Nreg 411, the microprograms for performing the adjustment processing in the output channel 207 or 208 of FIG. 2 and the coefficient data. Every sampling period, the NDSP 431 executes the microprograms of 3,072 steps while reading out the coefficient data. By repetition of the execution of the microprograms, the adjustment processing is performed for a plurality of channels. Audio signal (i.e., each sample data of the audio signal) to be processed is read out from the Nram 421, and the resultant processed signal is written into the Nram 421, Mram 422 or Oram 424.

As outlined above in relation to FIGS. 1A and 1B, the MDSP 432 is a DSP that performs the mixing processing via the mixing buses (ST and MIX buses 205 and 206) of FIG. 1. The Mreg 412 is a register for setting step-by-step coefficient data to be used during the operation of the MDSP 432 and setting step-by-step read addresses of the Mram 422. The Mreg 412 includes a mode register for setting a mode value as explained above in relation to FIG. 1B. The Mreg 412 does not store microprograms for the mixing processing; instead, the Mreg 412 contains a control signal generation section that generates control signals, corresponding to the mode set in the mode register, for 3,072 steps per sampling period by means of a hardware logic circuit. The MDSP 432 performs product-sum calculation processing of 3,072 steps every sampling period on the basis of the control signals generated by the control signal generation section, and, by repetition of such product-sum calculation processing, it performs the mixing processing in each of the predetermined number of the mixing buses corresponding to the mode. In the mixing processing, the coefficient data set in the Mreg 412 are used. Each audio signals to be mixed is read out from the Mram 422, and an audio signal of each of the mixing buses, with which the read-out audio signal is to be mixed, is input via the cascade input section (CIN) 433. Mixed signal, which is the result of the mixing processing in each of the mixing buses, is written into the Nram 421, Cram 423 and Oram 424.

In the above description of FIGS. 1A and 1B, each of the MLSIs is referred to as "DSP" in a broad sense of the integrated circuit that processes signals as a one-chip circuit, while, in the above description of FIG. 4, each of the NDSP and MDSP blocks is referred to as "DSP" in a narrow sense of the block that performs arithmetic processing within the integrated circuit.

The cascade input section (CIN) 433 is a cascade-transferred signal input circuit that functions as an interface for inputting a signal cascade-transferred from the preceding-stage MLSI. This cascade signal input operation is achieved in cooperation with the cascade output section (COUT) 434 of the preceding-stage MLSI. The CIreg 413 is a register for setting control data that define behavior of the cascade input section 433. The CPU 141 sets, as necessary, such control data of the CIreg 413 to control the behavior of the cascade input section 433. In the cascade transfer, as explained above in relation to FIGS. 1A and 1B, signals of the predetermined number of the mixing buses, corresponding to the mode (indicated by the mode register in the Mreg 412), are sequentially transferred every sampling period. The cascade input section 433 temporarily latches the sequentially-transferred signals of the mixing buses into a FIFO (First-In-First-Out) register provided in the input section 433, and then it outputs the latched signals to the MDSP 432 (see arrow 441) at predetermined timing. The MDSP 432 performs product-sum calculation processing of signals of a plurality of input channels in the MLSI and thereby sequentially generates signals to be mixed to the mixing buses. Thus, at the time point when the signal to be mixed to each of the mixing buses has been generated, the MDSP 432 inputs thereto the signal of the mixing bus from the FIFO register of the cascade input section 433; then the MDSP 432 mixes the generated signal with the input signal of the mixing bus. Note that the cascade input section 433 may write the cascade-transferred signal (hereinafter "cascade signal") of the mixing bus directly into the Nram 421 or Cram 423 (see arrow 442 or 443).

The cascade output section (COUT) 434 is a cascade output circuit that functions as an interface for reading out the data from the Cram 423 and outputting the read-out data to the succeeding-stage MLSI as a cascade signal. This cascade signal output operation is achieved in cooperation with the cascade input section (CIN) 433 of the succeeding-stage MLSI. The COreg 414 is a register for setting control data that control behavior of the cascade output section 434. The CPU

141 sets, as necessary, such control data of the COreg 414 to control the behavior of the cascade output section 434.

The input section (IN) 435 is an input interface circuit for inputting audio signals from the A/D converter, audio bus and/or serial bus. The audio signals input via the input section 435 are written into the Nram 421, Mram 422 or Oram 424. Behavior of the input section 435 is defined by control data set into the Ireg 415 by the CPU 141. The input patch section 203 of FIG. 2 is implemented by the input section 435. Namely, indicating which signal should be written into which address of the Nram 421 is equivalent to indicating which input port should be connected, via the input patch section 203, to which input channel.

The output section (OUT) 436 is an output interface circuit that reads out data of the Oram 424 and outputs the read-out data to the D/A converter, audio bus and/or serial bus. Behavior of the output section 436 is defined by control data set into the Oreg 416 by the CPU 141. The output patch section 209 of FIG. 2 is implemented by the output section 436. Namely, indicating a signal of which address of the Nram 421 should be output to which output line is equivalent to indicating which output channel should be connected, via the output patch section 209, to which output port.

Figure 5:
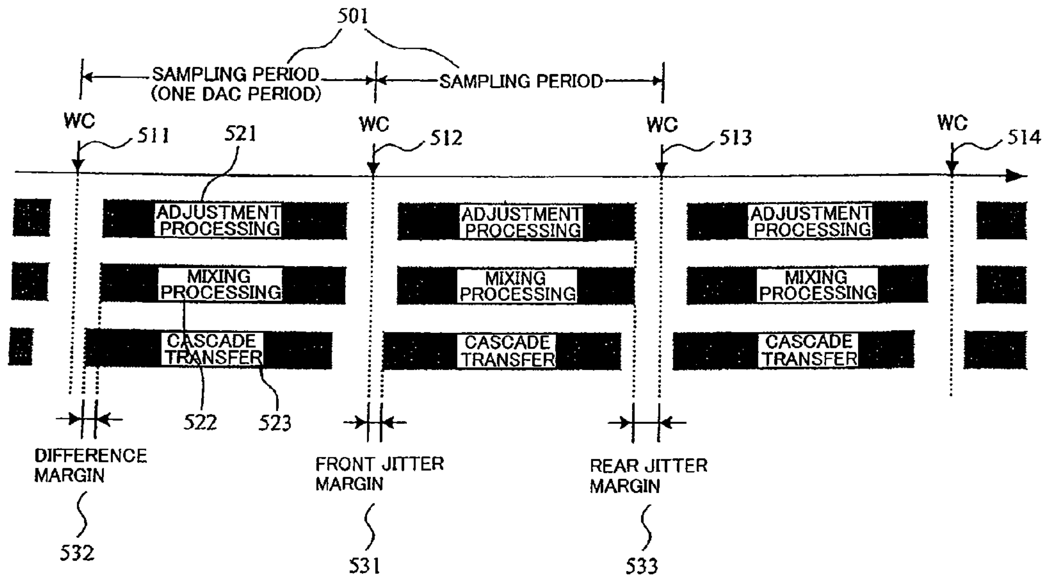
FIG. 5 is a time chart showing operation timing of the MLSI.

FIG. 5 is a time chart showing operation timing of a representative one of the MLSIs in the instant embodiment, where the horizontal axis represents the time, reference numerals 511-514 represent timing of the word clocks WC. Time length between the word clocks WC represents the sampling period. 521-523 represent time sections where the adjustment processing, mixing processing and cascade transfer processing are performed in one sampling period 501. The adjustment processing 521 and mixing processing 522 are started a predetermined time, defined by "front jitter margin 531+difference margin 532", after the timing of each word clock WC. Following a rear jitter margin 533 after completion of the adjustment processing 521 and mixing processing 522, the next work clock WC is given. The cascade transfer processing 523 is started earlier by the difference margin 532 than the start timing of the adjustment processing 521 and mixing processing 522. This is intended to allow a cascade signal to be input, through the cascade transfer, so as to be used in the mixing processing by the time point when a signal to be mixed with the signals of the individual mixing buses in the mixing processing 522 are generated, as will be later described in detail.

In the instant embodiment, where the sampling frequency is 48 kHz, one sampling period has a time length of 20.8 μsec. Because the adjustment processing 521 and mixing processing 522 each perform operations of 3,072 steps per sampling period in accordance with the operation clocks of 166 MHz, the processing can be completed within a time length of 18.5 μsec {i.e., $1/(166\times10^{6})\}\times3{,}072=18.5\times10^{-6}$ sec=18.5 μsec. Thus, the adjustment processing 521 and mixing processing 522 of 3,072 steps can be completed within one sampling period, and margins can be provided before and after the adjustment processing 521 and mixing processing 522.

Figure 6:
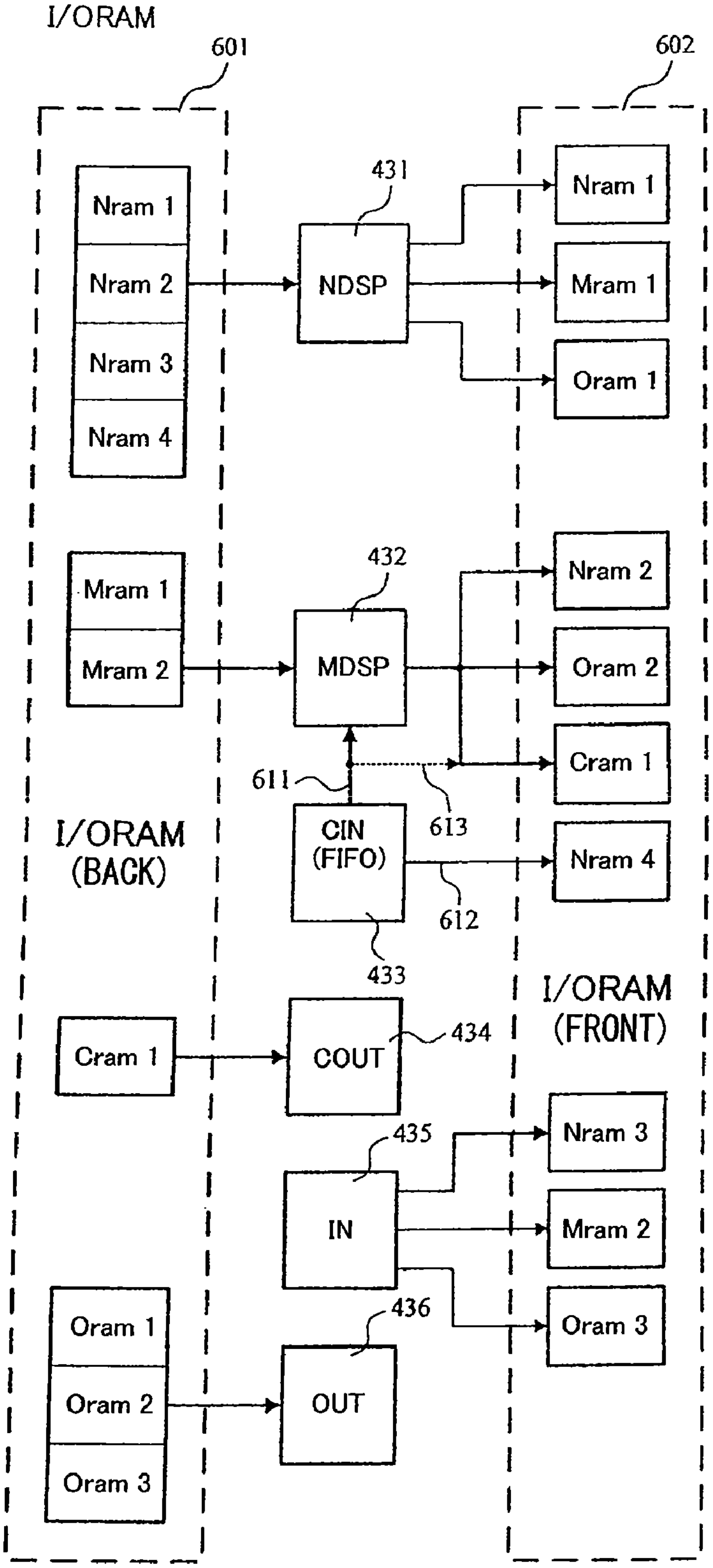
FIG. 6 is a diagram showing example constructions of front and back sides of an I/O RAM shown in FIG. 4.

FIG. 6 shows example constructions of front and back sides of the I/O RAM 420 shown in FIG. 4. Specifically, the I/O RAM 420 has a dual structure comprising a front-side storage area 602 and back-side storage area 601 that have same addresses, and switching is made between the front- and back-side storage areas 602 and 601 every sampling cycle (i.e., the front- and back-side storage areas 602 and 601 are used alternately every sampling cycle). The front-side storage area 602 is a write-only area (data-writing memory), while the back-side storage area 601 is a read-only area (data-reading memory). Because of the dual structure, data reading and writing can be performed simultaneously at any addresses in the I/O RAM 420. Data being read out in a given sampling period is data that was written at least one sampling period before the given sampling period.

The Nram that functions in the back-side storage area 601 as a read-only region of the NDSP 431 is divided into four regions, i.e. Nram1-Nram4. In the front-side storage area 602, Nram1 is a write-only region of the NDSP 431, Nram2 is a write-only region of the MDSP 432, Nram3 is a write-only region of the input section (IN) 435, and Nram4 is a write-only region of the cascade input section (CIN) 433. The Mram that functions in the back-side storage area 601 as a read-only region of the MDSP 432 is divided into two regions, i.e. Mram1 and Mram2. In the front-side storage area 602, Mram1 is a write-only region of the NDSP 431, and Mram2 is a write-only region of the input section (IN) 435. Cram1 in the back-side storage area 601 is a read-only region of the cascade output section (COUT) 434, while Cram1 in the front-side storage area 602 is a write-only region of the MDSP 432 or cascade input section (CIN) 433. The Oram that functions in the back-side storage area 601 as a read-only region of the output section (OUT) 436 is divided into three regions, i.e. Oram1, Oram2 and Oram3. In the front-side storage area 602, Oram1 is a write-only region of the NDSP 431, Oram2 is a write-only region of the MDSP 432, and Oram3 is a write-only region of the input section (IN) 435.

The NDSP 431 is capable of performing the arithmetic processing of 3,072 steps per sampling period, and, at each of the steps, it can read out an audio signal from a given address of Nram1-Nram4, performs the adjustment processing on the read-out audio signal and write the processed result of the adjustment processing into a given address of Nram1, Mram1 or Oram1; the read and write addresses for such purposes can be set as desired in the microprograms to be executed by the NDSP 431. Writing the processed signal into Nram1 is intended to again input data indicative of a halfway result in the NDSP 431 to the NDSP 431, by way of Nram1, for use in the adjustment processing. Writing the processed result into Mram1 is intended to pass the processed result of the adjustment processing to the mixing process by the MDSP 432. Writing the processed result into Oram1 is intended to output the result of the adjustment processing as-is by way of the output section (OUT) 436.

The MDSP 432, which is capable of performing the arithmetic processing of 3,072 steps every sampling period, can read out audio signals from given addresses of Mram1 and Mram2, perform a product-sum calculation on the read-out audio signals to thereby mix the audio signals. Further, the MDSP 432 can mix the mixing result, acquired at a predetermined position of the 3,072 steps, with a cascade signal (i.e., signal of each of the mixing buses) input from the cascade input section (CIN) 433 as indicated by arrow 611 (corresponding to arrow 441 of FIG. 4) and write the mixing result of the mixing bus into predetermined addresses of Nram2, Oram2 and Cram1. The read addresses of the Mram can be set as desired via the M register (Mreg) 412 per step. Timing of the cascade signal input from the cascade input section (CIN) 433 to the MDSP 432 is adjusted so that the mixed signal (i.e., cascade signal) of each of the mixing buses at a current time point has already been output from the CIN 433 to the MDSP 432 and prepared by the time point when the signal to be mixed with the cascade signal in the mixing bus is generated by the MDSP 432, as will be later described. Write addresses to Nram2, Oram2 and Cram1 are addresses corresponding to the individual addresses and determined mechanically. Here, "mechanically" means that the addresses can be generated by a logic circuit on the basis of clocks of each step in each sampling period and the number of the steps; in this case, no address register is necessary for storing the addresses. For example, where Nram2, Oram2 and Cram1 are expressed in an "array" notation, the mixing result of "mixing bus 0" is written into Nram2[0], Oram2[0] and Cram1[0], the mixing result of "mixing bus 1" is written into Nram2[1], Oram2[1] and Cram1[1], and so on. Writing the mixing results into Nram2 is intended to perform again the adjustment processing on the signals of the individual mixing buses. Writing the mixing results into Oram2 is intended to output the signals of the individual mixing buses as-is by way of the output section (OUT) 436. Further, writing the mixing results into Cram1 is intended to cascade-transfer the signals of the individual mixing buses to the succeeding-stage MLSI.

Dotted-line arrow 613 (corresponding to arrow 443 of FIG. 4) pointing from the cascade input section (CIN) 433 to Cram1 indicates a line for writing the cascade signal, input via the CIN 433, as-is to Cram1 when the cascade-transferred signals are to be cascade-transferred directly to the succeeding-stage MLSI. If the illustrated example of FIG. 1A is constructed in such a manner that the output-side MLSI123-1 outputs the signals of "mixing bus 0"-"mixing bus 31" to the output section 112-1 and the output-side MLSI123-2 outputs the signals of "mixing bus 32"-"mixing bus 63" to the output section 112-2, then the output-side MLSI123-1 causes the signals of "mixing bus 32"-"mixing bus 63" to pass therethrough, without being processed thereby, so that the signals are cascade-transferred directly to the output-side MLSI123-2.

The reason why a write line is indicated by arrow 612 (corresponding to arrow 442 of FIG. 4) pointing from the cascade input section (CIN) 433 to Nram4 is to indicate that, in the case where the MLSI in question is used on the output side (i.e., as an output-side MLSI), the cascade-transferred signals are passed to the NDSP 431 by way of Nram to thereby cause the NDSP 431 to perform the output-side adjustment processing. At that time, write addresses to Nram4 may be mechanically set at addresses corresponding to the individual mixing buses of the cascade signals. If Nram4 is expressed in an array notation, for example, the mixing result of "mixing bus 0" is written into Nram4[0], the mixing result of "mixing bus 1" is written into Nram4[1], and so on. In this case, the NDSP 431 acquires signals to be supplied to the adjustment processing of the individual output channels, by reading out from Nram4[0] the signal to be supplied to "output channel 0", reading out from Nram4[1] the signal to be supplied to "output channel 1", and so on.

The cascade output section (COUT) 434 repetitively performs the operations of mechanically reading out the mixed signals of the individual mixing buses from Cram1 and cascade-transferring the read-out mixed signals. In the case where the aforementioned array notation scheme is employed, the mixing results of "mixing 0", "mixing1", . . . are stored in Cram1[0], Cram1[1], . . . . Thus, the cascade output section 434 cooperates with the cascade input section (CIN) 433 of the succeeding-stage MLSI to sequentially cascade-transfer the mixed signals of the individual mixing buses of Cram1 at predetermined timing.

The input section (IN) 435 writes audio signals, input from the A/D converter, audio bus and/or serial bus, into given addresses of Nram3, Mram2 or Oram3. Write addresses for this purpose can be designated as desired via the Ireg 415. In this manner, part of the input patch section shown in FIG. 2 is implemented. The reason why the input audio signals are written into Nram3 is to pass the input audio signals to the input channel adjustment processing of the NDSP 431. The reason why the input audio signals are written into Mram2 is to pass the input audio signals as-is to the mixing processing of the MDSP 432. Further, the reason why the input audio signals are written into Oram3 is to output the input audio signals as-is by way of the output section 436.

The output section (OUT) 436 reads out and outputs audio signals stored at given addresses of Oram1-Oram3 at latch timing of output signals to the D/A converter, audio bus and/or serial bus. Read addresses for this purpose can be designated as desired via the Oreg 416. In this manner, part of the output patch section shown in FIG. 2 is implemented. Reading out or retrieving the signals from Oram1 is intended to output the output signals of the adjustment processing of the NDSP 431. Retrieving the signals from Oram2 is intended to output as-is the signals acquired from the mixing buses 205 and 206 of FIG. 2. Retrieving the signals from Oram3 is intended to pass the input signals as-is to the output patch section 209 of FIG. 2.

In FIGS. 4 and 6, thick-line arrows, which represent writing from the individual sections 431-436 to the front-side storage area 602, show a typical example style of usage where MLSI in question is employed as an input-side MLSI (i.e., one of MLSIs 122-1-122-*n* of FIG. 1A). Namely, according to this typical example style of usage on the input side, signal processing is performed such that signals input via the input section (IN) 435 are passed to the NDSP 431 by way of Nram3, results of the input channel adjustment processing of the NDSP 431 are passed to the MDSP 432 by way of Mram1 and results of the mixing processing of the MDSP 432 are passed to the succeeding-stage MLSI by way of Cram1 (or output as-is by way of Oram2). Thin-line arrows, on the other hand, represent a variation or modification of the style of usage.

Figure 7:
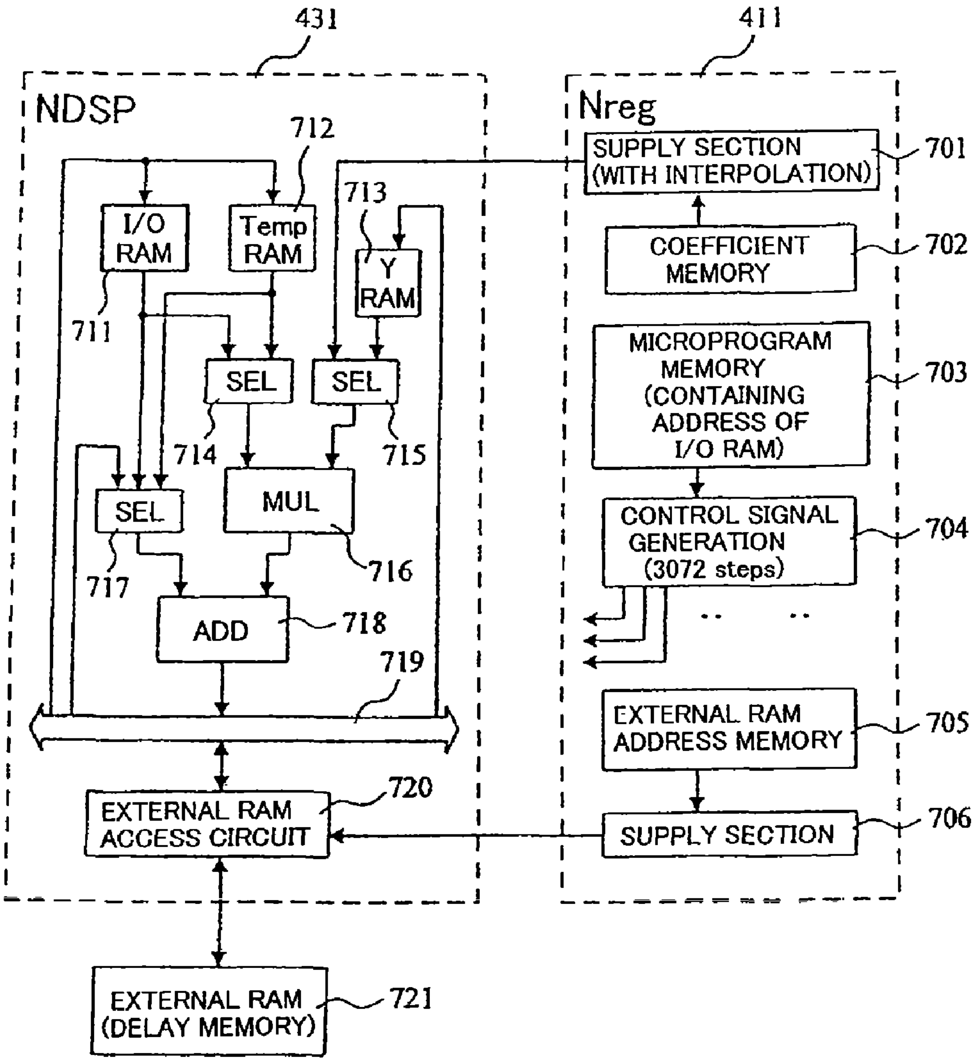
FIG. 7 is a diagram showing an internal construction of an NDSP.

FIG. 7 shows example internal constructions of the NDSP 431 and Nreg 411. The NDSP 431 includes an I/O RAM 711, temporary RAM 712, PRAM 713, selectors 714, 715 and 717, multiplier 716, adder 718, internal bus 719, and external RAM access circuit 720. Whereas the I/O RAM 711 is shown as provided within the NDSP 431, it is, in practice, a storage area provided outside the NDSP 431 as stated above in relation to FIGS. 4 and 6; as read areas, Nram1-Nram 4 correspond to the I/O RAM 711, while, as write areas, Nram1, Mram1 and Oram1 correspond to the I/O RAM 711. The Nreg 411 includes a coefficient data supply section 701 equipped with an interpolation function, coefficient memory 702, microprogram memory 703, control signal generation section 704, external RAM address memory 705, and external RAM address supply section 706.

The microprogram memory 703 is a storage area for setting microprograms which the CPU 141 wants the NDSP 431 to execute. As explained above in relation to FIGS. 4 and 6, the microprograms contain addresses of the I/O RAM 711 on which signals are to be read and written. The control signal generation section 704 generates control signals corresponding to the above-mentioned microprograms and supplies the generated control signals to various sections of the NDSP 431. On the basis of the control signals, the NDSP 431 repetitively performing processing of 3,072 steps in each sampling period, to thereby perform the adjustment processing for a plurality of channels. The number of the channels, for which the adjustment processing is to be performed, differs depending on the mode, as set forth above in FIG. 1B. Thus, in "mode 3", for example, the number of steps that can be used per channel can be made relatively great (i.e., 128 steps can be used per channel because the adjustment processing may be performed for 24 channels by allocating the 3,072 steps among the 24 channels). In "mode 2", the number of steps that can be used per channel is made relatively small (i.e., only 48 steps can be used per channel because the adjustment processing is performed for 64 channels by allocating the 3,072 steps among the 64 channels). In the case where the number of steps that can be used per channel is great, processing of one or more given blocks can be made complicate and/or functions can be added to the given blocks in the adjustment processing per channel shown in FIG. 3. Conversely, in the case where the number of steps that can be used per channel is small, processing of one or more given blocks sometimes has to be made simple or omitted in the adjustment processing per channel shown in FIG. 3. Because it is not necessarily essential to perform the same adjustment processing for all of the channels to be processed, many of the 3,072 steps may be allocated to one or more selected ones of the channels so that complicated adjustment processing can be performed for the selected channels while the remaining steps are allocated to the other channels so that simple adjustment processing may be performed for the other channels.

The CPU 141 sets coefficient data for each of the steps into the coefficient memory 702. The supply section 701 is equipped with the interpolation function, so that coefficient data interpolated by the interpolation function of the supply section 701 is supplied to the selector 715. When some coefficient data set in the coefficient memory 702 has been changed in value, the interpolation function supplies coefficient data having been interpolated over time in accordance with the coefficient value change (because the rapid value change of the coefficient data may undesirably lead to sound noise). The external RAM 721 is a delay memory to be used when a long-time-delayed signal is required for the processing by the NDSP 431. Addresses with which to access the external RAM 721 are set in the external RAM address memory 705. The supply section 706 supplies a predetermined accessing control signal to the external RAM access circuit 720 such that the external RAM access circuit 720 can read and write data from and to the external RAM 721.

The NDSP 431 is constructed similarly to the conventionally-known DSPs. The multiplier 716 multiplies data from the I/O RAM 711 or temporary RAM 712, selected by the selector 714, by coefficient data supplied from the supply section 701 or PRAM 713 selected by the selector 715, and then outputs the result of the multiplication to the adder 718. The adder 718 adds data from the internal bus 719, I/O RAM 711 or temporary RAM 712, selected by the selector 715, and data from the multiplier 716, and then outputs a result of the addition to the internal bus 719. The external RAM access circuit 720 is connected to the internal bus 719, so that data present on the internal bus 719 can be written into the external RAM 721 or data in the external RAM 721 can be read out to the internal bus 719. Data on the internal bus 719 can be written into the I/O RAM 711, temporary RAM 712 or PRAM 713, or input to the selector 717. The aforementioned various sections are constructed to perform "pipeline processing" such that they can read out data from the I/O RAM 711 per step and write resultant processed data into the I/O RAM 711 per step. The NDSP 431 performs the adjustment processing (see for example FIG. 3) for a plurality of channels by these sections operating on the basis of the control signals generated by the control signal generation section 704 in accordance with the microprograms set in the microprogram memory 703.

Figure 8:
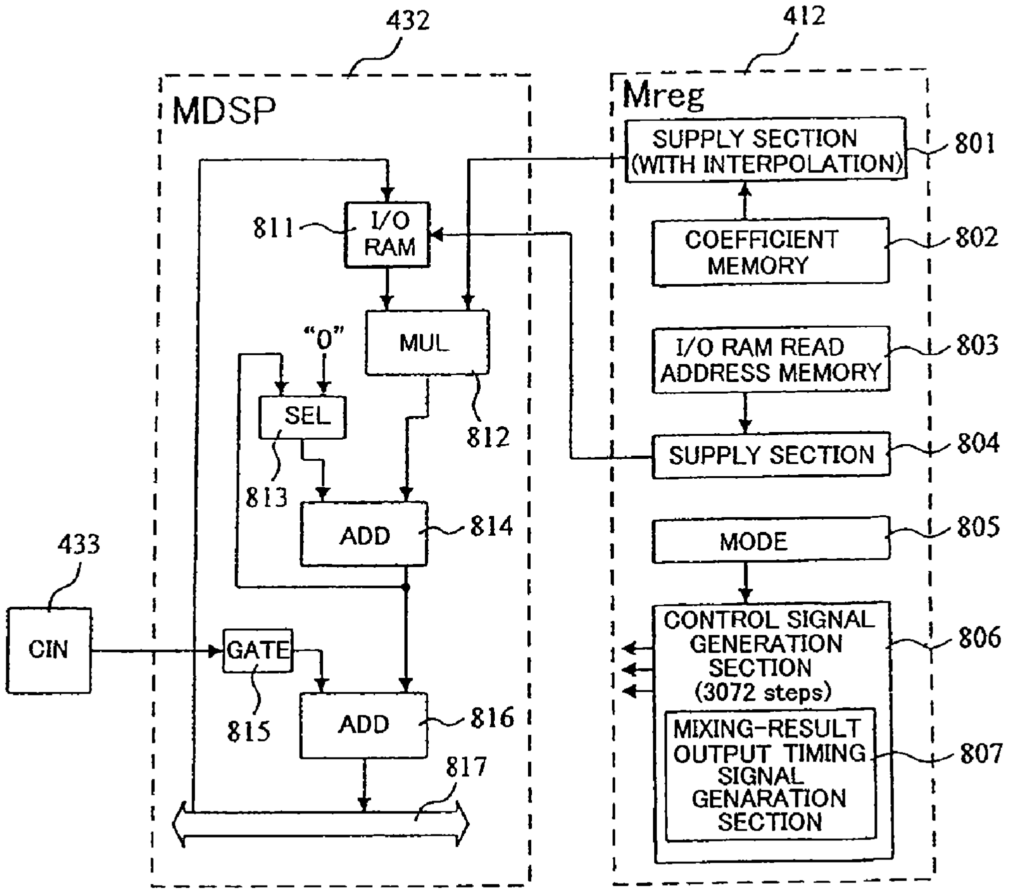
FIG. 8 is a diagram showing an internal construction of an MDSP.

FIG. 8 shows internal constructions of the MDSP 432 and Mreg 412. The MDSP 432 includes an I/O RAM 811, multiplier 812, selector 813, adder 814, gate 815, adder 816, and internal bus 817. Whereas the I/O RAM 811 is shown as provided within the MDSP 432, it is, in practice, a storage area provided outside the MDSP 432 as explained above in relation to FIGS. 4 and 6; as read areas, Mram1 and Mram2 correspond to the I/O RAM 811, while, as write areas, Nram2, Oram2 and Cram1 correspond to the I/O RAM 711. Mreg 412 includes a coefficient data supply section 801 equipped with an interpolation function, coefficient memory 802, I/O RAM read address memory 803, read address supply section 804, mode register 805, control signal generation section 806, and mixing-result output timing signal generation section 807.

The mode register 805 is a register for setting one of the modes explained above in relation to FIG. 1B. The control signal generation section 806 is a hardware logic circuit that generates control signals for controlling behavior of the various sections of the MDSP 432 in accordance with the set mode and supplies the generated control signals to the various sections. The MDSP 432 repetitively performs processing of 3,072 steps in each sampling period, to thereby perform the mixing processing. The mixing-result output timing signal generation section 807 is provided within the control signal generation section 806. Primarily, the mixing-result output timing signal generation section 807 generates timing signals for controlling timing of selection by the selector 813 and addition by the adder 816; the timing will be later described in detail in relation to FIG. 9. The coefficient memory 802 is a storage means for setting coefficient data per step. The interpolation function of the supply section 801 is similar to that of the supply section 701 of FIG. 7, by which interpolated coefficient data is supplied to the multiplier 812 per step. The I/O RAM read address memory 803 is a register for setting a read address per step. The supply section 804 reads out the read address from the memory 803 per step and supplies the read address to the I/O RAM 811.

At each of the steps, the multiplier 812 multiplies data read out from the I/O RAM 811 (Mram) with the address of that step, supplied by the supply section 804, by the coefficient data of the step supplied by the supply section 801, and it outputs the result of the multiplication to the adder 814. The selector 813 selectively outputs a value "0" at predetermined timing signaled by the mixing-result output timing signal generation section 807, but, at other timing, the selector 813 selectively outputs a result of addition by the adder 814. The adder 814 adds the output from the multiplier 812 and the output from the selector 813, and then it outputs the result of the addition. Although not specifically shown, there is provided an accumulator in a path extending from the output of the multiplier 814 back to the input of the selector 813, so that a result of addition by the adder 814 at any given step is temporarily stored into the accumulator, and the temporarily stored result becomes an input to the selector 813 at the next step. Therefore, the addition result input to the selector 813 is the result of the addition performed by the adder 814 at the preceding step. At predetermined timing signaled by the mixing-result output timing signal generation section 807, the adder 816 adds the output from the adder 814 and cascade signal (signal of the mixing bus) given from the cascade input section (CIN) 433 via the gate 815, and then it writes the results of the addition into the I/O RAM 811 by way of the internal bus 817. As stated above in relation to FIG. 6, this writing operation is intended to mechanically write the mixing results of the individual mixing buses into corresponding positions of Nram2, Oram2 and Cram1. Write addresses to be used in this writing operation are contained in advance in the control signals generated in accordance with the currently-set mode. The aforementioned various sections are constructed to perform "pipeline processing" such that they can read out data from the I/O RAM 811 per step and write resultant processed data into the I/O RAM 811 per step. If the gate 815 is closed, the audio signals cascade-input from the preceding stage are prevented from being added; thus, as the result of the mixing bus processing by the MLSI is output, then new cascade transfer will start at this point. Therefore, in the case where the circuit board shown in FIG. 1A is used, such a style of usage allows each of MLSIs to operate as an independent mixer by dividing x (an arbitrary integral number) preceding MLSIs and y (arbitrary integral number) succeeding MLSIs into groups. In such a case, the (x+1)th MLSI may be assigned to perform the input-side processing with the gate 815 closed, and the cascade may be divided at the (x+1)th MLSI.

Where the MLSI in question is employed as an input-side MLSI, the gate 815 is always kept in opened so that the MDSP 432 can receive the cascade signal from the preceding-stage MLSI. Where the MLSI in question is employed as an output-side MLSI, on the other hand, the MDSP 432 is not used in the typical style of usage, and thus, the gate 815 is always kept closed. The "typical style of usage" on the output side is, for example, a style where, of the signals of the mixing buses cascade-transferred from the input-side MLSI, only the signal to be subjected to the adjustment processing in the output channel of the MLSI is passed from the cascade input section (CIN) 433 to the NDSP 431 via Nram4 so that the adjustment processing is performed thereon by the NDSP 431—all of the signals, including the signal to be subjected to the adjustment processing in the output channel of the MLSI, are passed from the cascade input section 433 to the succeeding-stage output-side MLSI without being processed by the MDSP 432-, and the result of the adjustment processing of the output channel by the NDSP 431 is output to the outside via Oram1 (see FIG. 6). Because the MDSP is not used at all in the output-side processing, a gate may be provided on a line over which the operation clocks are supplied to the MDSP, and the output-side MLSI may close the gate so as to prevent the operation clocks from being supplied to the MDSP; in this way, it is possible to reduce power consumption by an amount corresponding to the prevention of the operation clock supply. As a variation or modification, the result of the output-side adjustment processing by the NDSP 431 may be passed via Mram1 to the MDSP 432 to allow the MDSP 432 to perform the mixing processing on the result of the output-side adjustment processing; in this case, arrangements may be made to allow the result of the output-side adjustment processing to be mixed with the cascade-transferred signals with the gate 815 opened.

Figure 9:
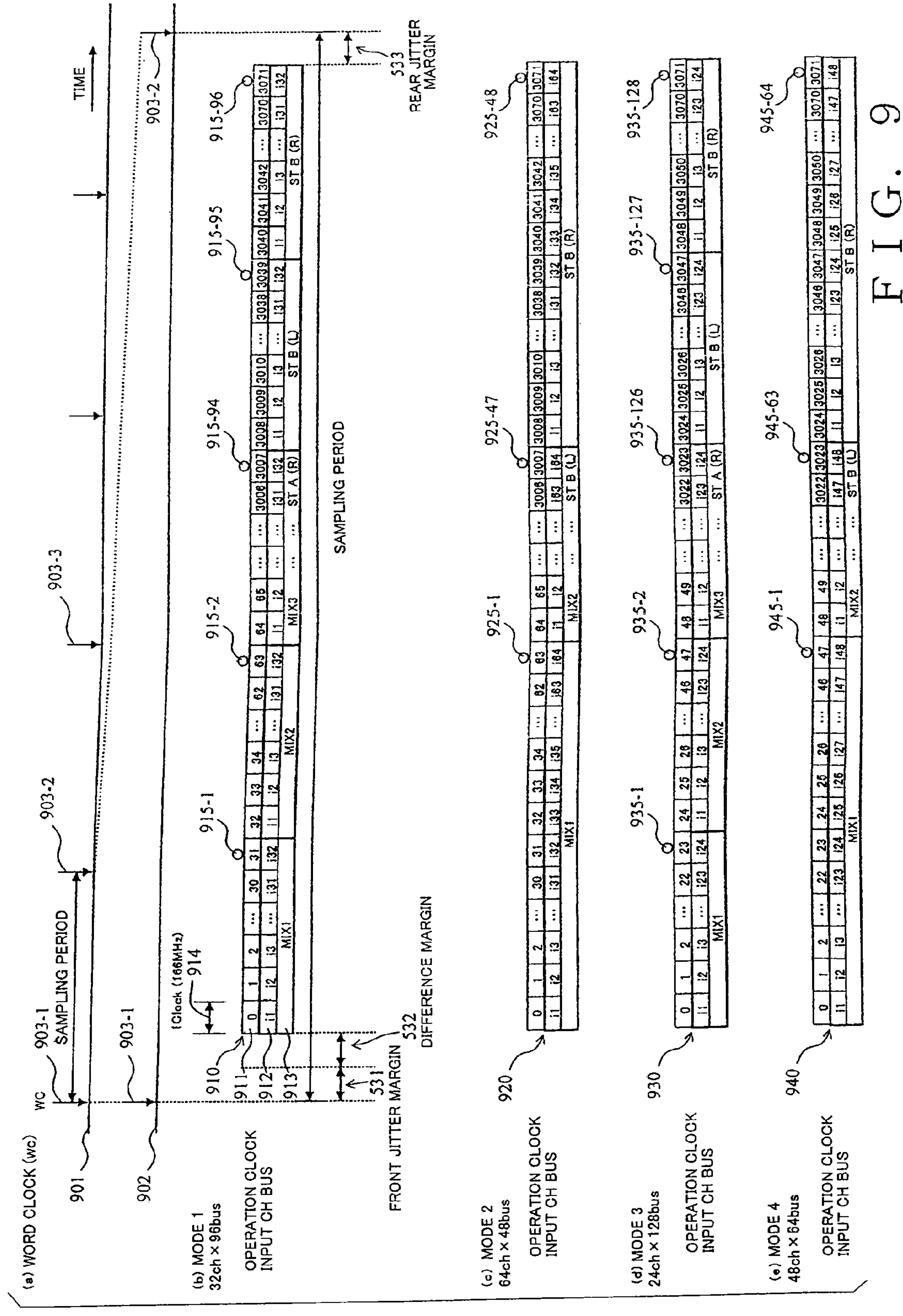
FIG. 9 is a time chart explanatory of the mixing processing performed by the MDSP.

The following paragraphs describe details of the mixing processing performed by the MDSP 432 of FIG. 8. FIG. 9 is a time chart explanatory of the mixing processing performed by the MDSP 432 in the individual modes. Reference numeral 901 in (a) of FIG. 9 shows a manner in which word clocks WC are sequentially generated in accordance with the passage of time, one word clock WC per sampling period, as indicated at 903-1, 903-2, . . . . Reference numeral 902 shows in enlarged scale one sampling period between the word clocks 903-1 and 903-2.

910 in (b) of FIG. 9 is a block showing an operational flow of the mixing processing performed in one sampling period by the MDSP 432 in "mode 1", which corresponds to the mixing processing 522 explained above in relation to FIG. 5. The mixing processing of block 910 is started a predetermined time "front jitter margin 531+difference margin 532" after the timing 903-1 of the corresponding word clock WC, and, after completion of the mixing processing, a rear jitter margin 533 is secured till the next word clock WC 903-2. 914 indicates a period of each operation clock in which the MDSP 432 performs an operation of one step. "Operation Clock within MLSI" row 911 in (b) of FIG. 9 indicates a sequence of the numbers (0-3,072) of the 3,072 steps performed by the MDSP 432. "Input Channel" row 912 indicates input channels of which signals are to be read out from the I/O RAM 811. "Bus" row 913 shows mixing buses via which the mixing processing is to be performed.

The following paragraphs explain operations of the individual steps sequentially performed in "mode 1" with reference to (b) of FIG. 9.

(1) First, the operation of "step 0" is explained. In the MDSP 432 of FIG. 8, an address corresponding to "step 0" is read out from the read address memory 803, and data stored at the address of the I/O RAM 811 (Mram) (this data corresponds to "i1" indicated immediately below "step 0" in FIG. 9 and will hereinafter be referred to as "data of chi1") is input to the multiplier 812. Result of the input channel adjustment processing by the NDSP 431 or signal (sample data) input via the input section (IN) 435 has been written at the abovementioned address of the Mram at least by the preceding step. Further, coefficient data corresponding to "step 0" is input from the supply section 801 to the multiplier 812. The multiplier 812 multiplies the data read out from the Mram and the input coefficient data, and the result of the multiplication is input to the adder 814. At "step 0", a control signal is given such that the selector 813 selectively outputs "0". Thus, the adder 814 adds the value "0" and the abovementioned multiplication result, and the result of the addition is stored into the not-shown accumulator for use at the next step as noted above in relation to FIG. 8.

(2) The operation of step 1 is described below. In the MDSP 432, an address corresponding to "step 1" is read out from the read address memory 803, and data stored at the address of the Mram (i.e., "data of chi2" indicated immediately beneath "step 1" in the row 912) is input to the multiplier 812. Further, coefficient data corresponding to "step 1" is input from the supply section 801 to the multiplier 812. The multiplier 812 multiplies the data read out from the Mram and the input coefficient data, and the result of the multiplication is input to the adder 814. At "step 1", a control signal is given such that the selector 813 selectively outputs the addition result, stored in the not-shown accumulator at preceding "step 0". Thus, the adder 814 adds the preceding addition result and the abovementioned multiplication result, and the result of the addition by the adder 84 is stored into the not-shown accumulator for use at the following step. Operations similar to the aforementioned are performed at "step 2" through "step 31". Assuming that the currently-set mode is "mode 1", the NDSP 431 in the MLSI performs the adjustment processing for 32 channels. Thus, the signals of all of the 32 channels, generated within the MLSI, can be mixed together by writing the signals of the 32 channels into the Mram, then reading out the thus-written signals from the Mram as the data of "chi1-chi32" and performing the product-sum calculations to multiply the read-out signals by the corresponding coefficients and accumulating the results of the multiplication. The result of the mixing is then output from the adder 814 at "step 31".

(3) At "step 31" depicted at 915-1 in (b) of FIG. 9, the following process is performed following the process of (2) above. At the timing the mixing result of all of the 32 channels, generated within the MLSI, is output from the adder 814, signals cascade-transferred from the preceding-stage MLSDI are received from the cascade input section (CIN) 433 via the gate 815, and the addition result output from the adder 814 is added with the cascade signal. In the case of the MLSI 122-1 shown in FIG. 1A, to which no cascade signal is input (i.e., whose cascade input terminal is connected with nothing), it is assumed that a value "0" is always input thereto, so that the adder 814 adds the mixing result output therefrom with the value "0". The result of the addition by the adder 816 is written into a predetermined address of the I/O RAM 811. What is cascade-transferred from the preceding-stage MLSI at the timing 915-1 is a signal of "mixing bus 0" (MIX1). Further, because the respective coefficient data by which the data of "chi1"-"chi32" are multiplied can be set as desired, data of "chi*" that is not to be mixed with the signal of "mixing bus 0" (i.e., that is not to be mixed to "mixing bus 0") can be prevented from being mixed to "mixing bus 0", by setting the corresponding coefficient data in the coefficient memory at "0". Namely, in short, the addition by the above-mentioned adder 816 means adding a mix of the signals to be mixed to "mixing bus 0" from among the signals of all of the channels generated in the MLSI (i.e., output from the adder 814) and the signal of "mixing bus 0" input from the preceding-stage MLSI (i.e., output from the gate 815). As explained above in relation to FIG. 6, the addition result of the adder 816 (mixing result of "mixing bus 0") is mechanically written into addresses, corresponding to "mixing bus 0", of Nram2, Oram2 and Cram1.

(4) At "step 32" through "step 63", operations similar to those of "step 0" through "step 31" are performed, except that the mixing is performed here for "mixing bus 1" (MIX2) instead of "mixing bus 0". Then, operations of "step 3040"-"step 3071" are performed to sequentially perform the mixing up to the mixing for "mixing bus 95" (R of stereo B) in a manner similar to the aforementioned.

In the above-described manner, it is ensured that desired ones of signals of the 32 channels, generated by the MLSI, can be mixed with signals of desired ones of the 96 mixing buses (i.e., can be mixed to desired ones of the 96 mixing buses). As seen from the foregoing description, control is performed in "mode 1" such that the addition by the adder 816 and writing, into Nram2, Oram2 and Cram1, of the result of the addition (mixing) by the adder 816 is executed at the timing of "step 31", "step 63", . . . , "step 3,030" and "3,071" (i.e., 915-1-915-96 in (b) of FIG. 9) so that the selector 813 selectively outputs the value "0" at the timing of "step 0", "step 32", "step 64", . . . , "step 3,040". These timing is detected by the mixing-result output timing signal generation section 807, so that predetermined control signals are supplied to the various sections of the MDSP 432 (as will be later detailed in relation to FIGS. 10A and 10B).

Whereas (b) of FIG. 9 shows the case where the currently-set mode is "mode 1", operations similar to the aforementioned are performed in the other modes. In the case of "mode 2" shown in (c) of FIG. 9, where the numbers of input channels and mixing buses are "64" and "48", respectively, the mixing is performed for the group of 64 channels, and the mixing result is mixed with signals of the 48 mixing buses at steps 63, 127, . . . , 3,071 (925-1, . . . , 925-48 in (c) of FIG. 9). In the case of "mode 3" shown in (d) of FIG. 9, where the numbers of input channels and mixing buses are "24" and "128", respectively, the mixing is performed for the group of 24 channels, and the mixing result is mixed with signals of the 128 mixing buses at steps 23, 47, . . . , 3071 (935-1, . . . , 935-128 in (d) of FIG. 9). Further, in the case of "mode 4" shown in (d) of FIG. 9, where the numbers of input channels and mixing buses are "48" and "64", respectively, the mixing is performed for the group of 48 channels, and the mixing result is mixed with signals of the 48 mixing buses at steps 47, 95, . . . , 3,071 (945-1, . . . , 945-64 in (e) of FIG. 9).

Whereas, in each of the modes in the illustrated example of FIG. 9, "chi1", "chi2", . . . , are indicated as the input channels to be mixed with the signals of the individual mixing buses, even the same "chi1", for example, does not necessarily use the same signal. This is because, a read address of the Mram can be set in the address memory 803 for each of the 3,072 steps as noted above in relation to FIG. 8. Thus, a desired signal can be input for mixing into (i.e., mixing with signals of) the mixing buses; for example, a signal of "chi1" to be mixed to "MIX1" at "step 0" in "mode 1" may be taken out at the pre-fader position of FIG. 3 (i.e., output of the compressor (Comp) 303), a signal of "chi1" to be mixed to "MIX2" at step "step 32" may be taken out at the post-fader position of FIG. 3 (i.e., output of the channel-ON switch (CH_ON) 305, and so on.

As set forth above, the MDSP 432 of the MLSI is a DSP capable of performing 3,072 product-sum calculations (i.e., product-sum calculation processing of 3,072 steps) (each consisting of one multiplication and one addition) within each sampling period, and such 3,072 product-sum calculations are used in accordance with any one of combinations (based on "number of channels×number of mixing buses=3,072") which corresponds to the currently-set mode. Generally, it is only necessary that the MDSP 432 be constructed as shown in FIG. 8 and in the manner as stated at (1)-(3) below.

(1) The MDSP 432 is a DSP constructed to perform H (H=J×K) ("J" and "K" are each an integral number greater than "1") product-sum calculations within each sampling period, and let it be assumed that a plurality of combinations, such as ($J_1$, $K_1$) and ($J_2$, $K_2$), are possible with respect to the fixed value H. These combinations are allocated to "mode 1", "mode 2", . . . , and, in "mode m" (m=1, 2, . . . ), the number of channels is $J_m$ while the number of mixing buses is $K_m$. In the illustrated example of (b) of FIG. 1, for example, H=3,072, and $J_1$=32 and $K_1$=96 in "mode 1", $J_2$=64 and $K_2$=48 in "mode 2", $J_3$=24 and $K_3$=128 in "mode 3", and $J_4$=48 and $K_4$=64 in "mode 4".

(2) Then, the control signal generation section 806 generates control signals corresponding to the set mode.

Thus, within each sampling period, the selector 813 is caused to selectively output "0" at each of steps h (=0, $J_m$, 2 $J_m$, . . . , ($K_m$−1)×$J_m$), and the multiplier 812 and adder 814 perform arithmetic operations of "data[h]×coefficient[h]+'0'→accumulator".

At each of the other steps h, the selector 813 is caused to selectively output the output of the adder 814 produced at the preceding step, i.e. value of the not-shown accumulator, and the multiplier 812 and adder 814 perform arithmetic operations of "data[h]×coefficient[h]+accumulator→accumulator". Here, "data[h]" is data read out from the Mram with a read address, corresponding to "step h", stored in the read address memory 803, "coefficient[h]" is a coefficient value, corresponding to "step h", supplied from the coefficient memory 802, and "h" indicates a step number that is an integral number in the range of "0" to "H-1".

(3) Further, at each of steps h (=$J_m$−1, 2$J_m$−1, . . . , $K_m$×$J_m$−1), the adder 816 performs arithmetic operations of "accumulator+cascade signal→Nram2, Oram2 and Cram1". These are operations in which a signal cascade-transferred from the preceding-stage MLSI is input via the cascade input section (CIN) 433 and gate 815 and then the addition result output from the adder 814 and the cascade-transferred signal are added together via the adder 816. Here, the mixing result of "mixing bus 0", mixing result of "mixing bus 1", . . . , and mixing result of "mixing bus $K_m$−1" are written at steps $J_m$−1, 2$J_m$−1, . . . , and $K_m$×$J_m$−1, respectively, into locations, corresponding to the mixing buses, of Nram2, Oram2 and Cram1.

In the aforementioned manner, each of the MDSPs can be constructed in a generalized form. From the viewpoint of the construction of the DSP, it is reasonable to set "J" and "K" at values containing powers of two. For example, it is preferable to set "J" at a value "a×$2^s$" and "K" at a value "b×$2^t$" and allocate "J" and "K" to a plurality of modes with various different combinations of values of "s" and "t".

Figures 10A, 10B:
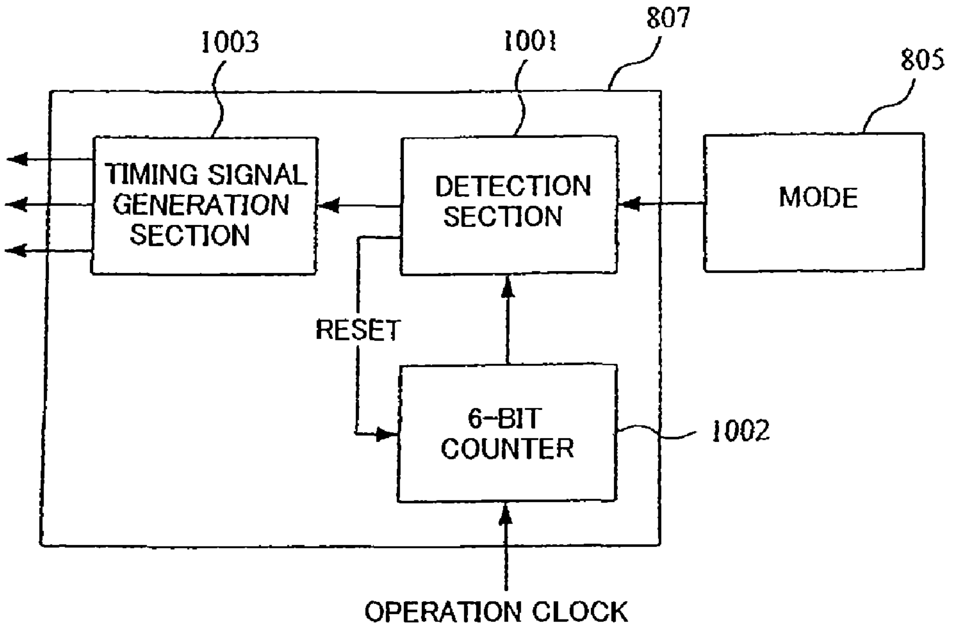
FIGS. 10A and 10B are diagrams showing a detailed construction of a mixing-result output timing signal generation section shown in FIG. 8.

FIG. 10A shows a detailed construction of the mixing-result output timing signal generation section 807 shown in FIG. 8, which includes a detection section 1001, 6-bit counter 1002 and timing signal generation section 1003. The 6-bit counter 1002 is reset to "0" at "step 0" and then counts up every operation clock, i.e. per step. The detection section 1001 detects a time point when the 6-bit counter 1002 has presented any one of 6-bit patterns, shown in FIG. 10B, corresponding to the currently-set mode. Namely, in "mode 1", the detection section 1001 detects respective timing of "step 31", "step 63", . . . , "step 3039" and "step 3071" shown in (b) of FIG. 9; in "mode 2", the detection section 1001 detects respective timing of "step 63", "step 127", . . . , "step 3071" shown in (c) of FIG. 9; in "mode 3", the detection section 1001 detects respective timing of "step 23", "step 47", . . . , "step 3071" shown in (d) of FIG. 9; and, in "mode 4", the detection section 1001 detects respective timing of "step 47", "step 95", . . . , "step 3071" shown in (e) of FIG. 9. At each of the detected timing, control signals are generated such that the addition by the adder 816 and writing, into Nram2, Oram2 and Cram1, of the result of the addition is effected. Because the result of the addition is written into locations, corresponding to the mixing bus, of Nram2, Oram2 and Cram1 as explained above in relation to FIG. 6, the mixing-result output timing signal generation section 807 includes a counter (not shown) for providing a count indicating at which position in one sampling period the current write timing has been generated (i.e., which number write timing in the sampling period the current write timing is), and it generates a control signal such that the addition result is written into locations corresponding to the count value of the counter. The detection section 1001 outputs a reset signal, at a step immediately following the time point when any one of the patterns shown in FIG. 10B has been detected (e.g., at the time point of each of "step 32", "step 64", . . . , "step 3040"), to reset the 6-bit counter 1002 to "0". Further, at that time point, the timing signal generation section 1003 generates a control signal to control the selector 813 to selectively output the value "0".

Figure 11:
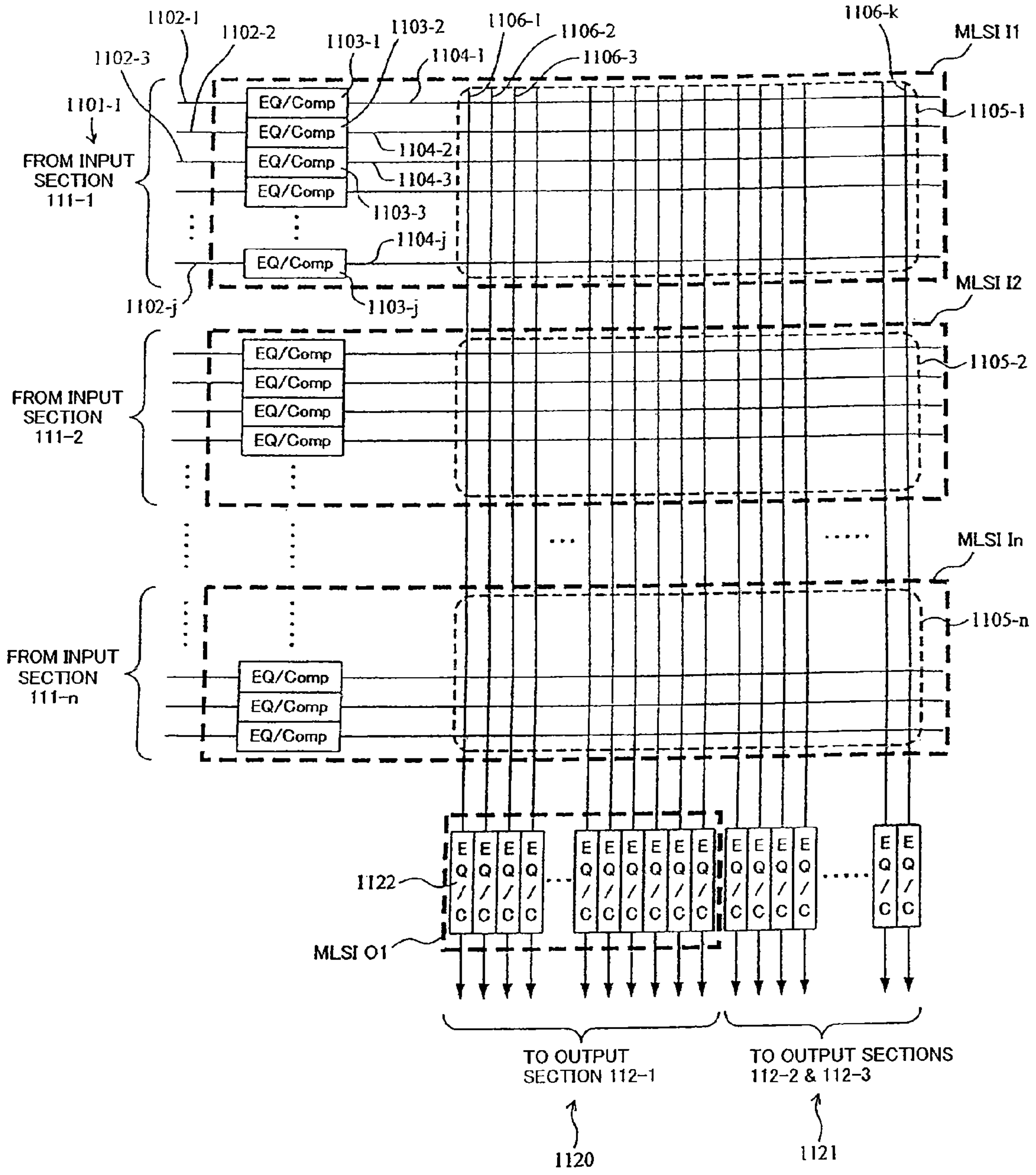
FIG. 11 is a conceptual diagram showing flows of signals between the MLSIs.

FIG. 11 is a conceptual diagram showing flows of signals when the plurality of MLSIs, interconnected as shown in FIG. 1A, perform the processing explained above in relation to FIGS. 7-10B. Thick-line block indicated at "MLSI I1" represents the arithmetic processing performed by "MLSI I1" of FIG. 1A. Similarly, thick-line blocks indicated at "MLSI I2"-"MLSI In" represent the arithmetic processing performed by "MLSI I2"-"MLSI In". In "MLSI I1", signals of j (integral number) input channels (i.e., signals received via the input section 111-1) are input via lines **1102-1-1102-*j*. These lines 1102-1-1102-*j* represent passing of signals, input via the input section (IN) 435, to the NDSP 431 via Nram3 (see FIGS. 4 and 6). When the currently-set is "mode 1", for example, j=32 because the number of input channels is "32" in "mode 1". "EQ/Comp" blocks 1103-1-1103-*j* each represent the adjustment processing for one of the input channels performed by the NDSP 431 of "MLSI I1" (see FIG. 3). Outputs from the adjustment processing of the individual input channels are supplied, via lines 1104-1-1104-*j*, to a dotted-line block 1105-1. This block 1105-1 represents the mixing processing performed by the MDSP 432 of "MLSI I1". Lines 1104-1-1104-*j* represent passing of signals from the NDSP 431 to the MDSP 432 via Mram1 (see FIGS. 4 and 6**).

Lines **1106-1-1106-*k*, vertically extending across the mixing processing 1105-1-1105-*n*, represent k (integral number) mixing buses. When "mode 1" is set, for example, k=96 because the number of mixing channels is "96" in "mode 1". Assuming that the lines 1106-1-1106-*k* represent "mixing bus 0", "mixing bus 1", . . . , "mixing bus k−1", respectively, intersection points between the line 1106-1 corresponding to "mixing bus 0" and the lines 1104-1-1104-*j* corresponding to the individual input channels, for example, represent mixing the signals of the individual channels within "MLSI I1" to "mixing bus 0". Description similar to the aforementioned apply to "MLSI I2"-"MLSI In". However, as stated above, the actual product-sum calculations performed in the instant embodiment comprise: first mixing signals of the individual input channels within each of the MLSIs; then mixing the result of the mixing within the MLSI with a cascade-transferred signal of the mixing bus; and then cascade-transferring the result of the mixing by the mixing bus to the next-stage MLSI. Signal of each of the mixing buses cascade-transferred from the last-stage, input-side MLSI (i.e., "MLSI In") is supplied to the output-side MLSIs; only "MLSI O1" is shown in FIG. 11. "EQ/C" blocks 1122 represent the output-side adjustment processing performed in "MLSI O1". 1120 and 1121 represents signals delivered to the output sections 112-1-112-3**. In the MLSIs, the combination of values of "j" and "k" can be changed as the set mode is changed.

Figure 12:
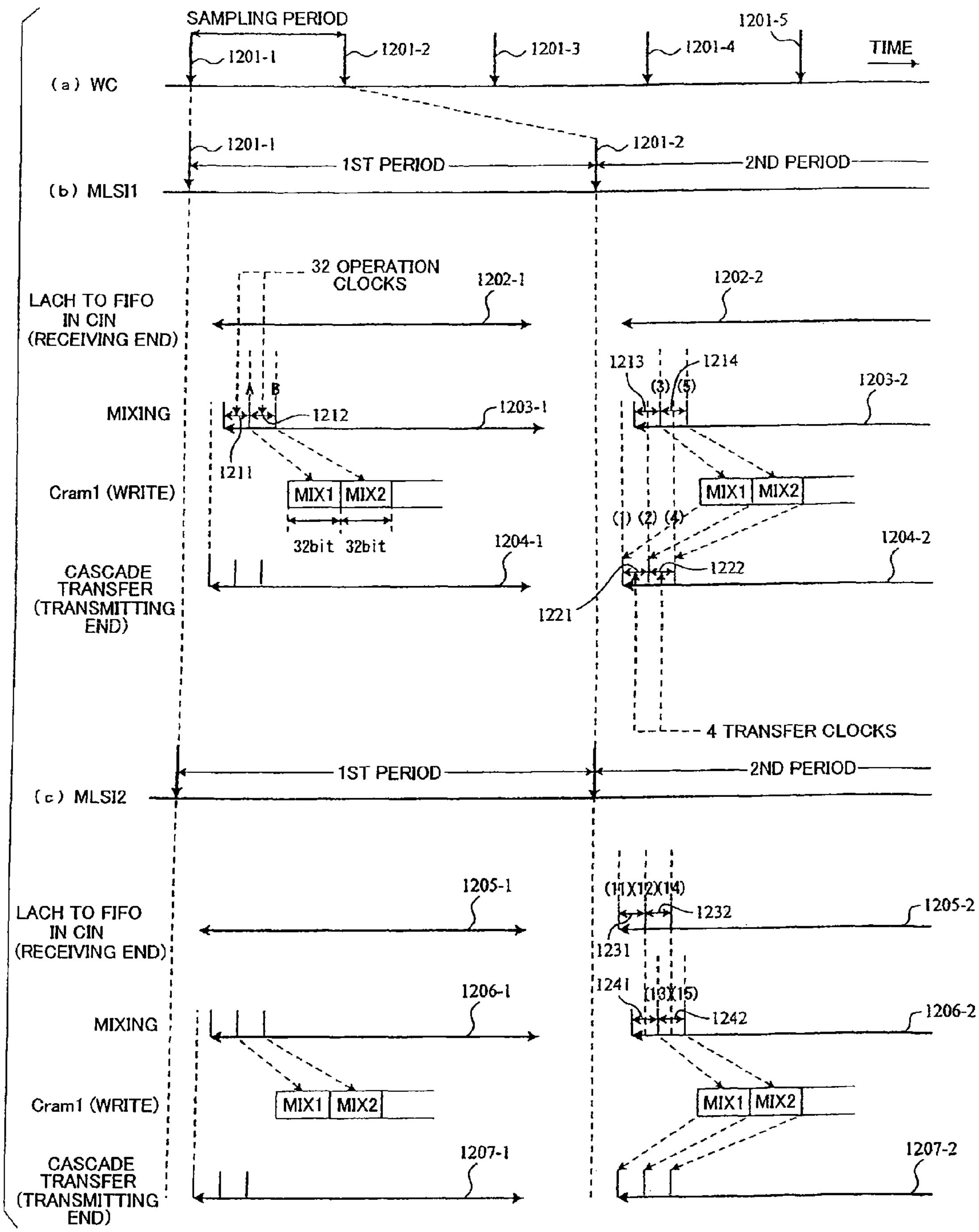
FIG. 12 is a time chart of cascade transfer.

FIG. 12 is a time chart of the cascade transfer. (a) of FIG. 12 shows timing 1201-1-1201-5 of the word clocks WC. (b) of FIG. 12 shows behavior of the first MLSI (hereinafter referred to as "MLSI1") in first and second sampling periods, and (c) of FIG. 12 shows behavior of the second MLSI (hereinafter referred to as "MLSI2"). Let it be assumed here that the cascade-transfer output terminals of "MLSI1" are connected to the cascade-transfer input terminals of "MLSI2". The following paragraphs describe an operational sequence of the cascade transfer from "MLSI1" to "MLSI2", assuming that "mode 1" is currently set and "MLSI1" is a leading MLSI in the cascade transfer flow.

In (b) and (c) of FIG. 12, "Latch-to-FIFO" sections 1202-1, 1202-2 and 1205-1, 1205-2 are where each of the MLSIs performs, in each sampling period, receiving-side processing for receiving signals cascade-transferred from the preceding-stage MLSI and sequentially latching the received signals into the FIFO within the cascade input section (CIN) 433. "Mixing Processing" sections 1203-1, 1203-2 and 1206-1, 1206-2 are where signals having been subjected to the adjustment processing within each of the MLSIs are mixed to (i.e., mixed with signals) the individual mixing buses. "Cram1 (write)" indicates a manner in which mixing results are sequentially stored into Cram1 shown in FIGS. 4 and 6, instead of indicating a time wise flow. MIX1, MIX2, of Cram1 indicate regions for storing the mixing results of "mixing bus 0", "mixing bus 1", "Cascade Transfer" sections 1204-1, 1204-2 and 1207-1, 1207-2 are where signals are cascade transfered from the MLSI to the succeeding-stage MLSI (transmitting-end processing).

In the mixing processing section 1203-1, "MLSI1" performs the mixing processing of the block 910 in "mode 1". Then, "MLSI1" sequentially writes the mixing results of "mixing bus 0"-"mixing 95" into Cram1 (and Nram2 and Oram2) at timing 915-1-915-96. More specifically, in (b) of FIG. 12, a section 1211 corresponds to processing sections of "step 0"-"step 31" shown in (b) of FIG. 9, and a section 1212 corresponds to processing sections of "step 32"-"step 63" shown in (b) of FIG. 9; the other sections 1213, . . . correspond to processing sections of the other steps. Thus, end timing of the section 1211 corresponds to the timing 915-1 in (b) of FIG. 9 and end timing of the section 1212 corresponds to the timing 915-2 in (b) of FIG. 9; therefore, the mixing result of "mixing bus 0" (i.e., result of signals being mixed to "mixing bus 0" from among the signals of all of the channels generated by "MLSI1") is written into Cram1 (MIX1) at timing A, the mixing result of "mixing bus 1" is written into Cram1 (MIX2) at timing B, and then in a similar manner to the aforementioned, the mixing results of "mixing bus 2" through "mixing bus 95" are written into Cram1 in the section 1203-1. As explained above in relation to FIG. 9, the mixing results to be written into Cram1 in each of the MLSIs are the results of adding the signals, cascade-transferred from the preceding-stage MLSI, with the mixing result of the signals of the individual channels having been subjected to the adjustment processing in the MLSI. However, because there is no MSLI that precedes "MLSI1", no cascade signal is added to the mixing result of the signals having been subjected to the adjustment processing by "MLSI1". Therefore, what is written into Cram1 in the mixing processing in the section 1203-1 is just the mixing result of the signals of the individual channels having been subjected to the adjustment processing by "MLSI1". The mixing processing performed in and after the mixing processing section 1203-2 of the second sampling period is similar to the aforementioned mixing processing.

In the cascade transfer section 1204-2 of the second sampling period, the individual data of "mixing bus 0"-"mixing bus 95", written into Cram1 in the above-mentioned mixing processing section 1203-1, are cascade-transferred to "MLSI2". First, transfer, from Cram1, of the data of "mixing bus 0" (MIX1) is started at timing (1), carried out in the section 1221 and ended at timing (2). Then, transfer of the data of "mixing bus 1" (MIX2) is started at timing (2), carried out in the section 1222 and ended at timing (4). In a similar manner to the aforementioned, transfer, from Cram1, of the data of "mixing bus 3" through "mixing bus 95" is sequentially carried out. Note that, in "mode1", transfer of one data (32 bits) is carried out in response to four transfer clocks (32 operation clocks): the transfer clock will be later described with reference to FIG. 13.

Mixing processing is performed in the mixing processing section 1203-2 of the second sampling period, in a similar manner to the mixing processing performed in the mixing processing section 1203-1. Namely, the mixing result of "mixing bus 0" is written into Cram1 (MIX1) at end timing (3) of the section 1213, the mixing result of "mixing bus 1" is written into Cram1 (MIX2) at end timing (5) of the section 1214, and then in a similar manner to the aforementioned, the mixing results of "mixing bus 2" through "mixing bus 95" are written into Cram1.

Timing (1)-timing (5) indicates timewise order. Namely, transfer, from Cram1, of the mixing result of "mixing bus 0" (MIX1) is started at timing (1), and after termination of the transfer at timing (2), the mixing result of "mixing bus z" (MIX2) is written into Cram1 at timing (3) a little later than timing (2). Thus, in the regions of Cram1 storing the mixing results of the individual mixing buses, the next mixing result is written after the cascade transfer of the previous data, so that there occurs no conflict between the data in Cram1. This is because the cascade transfer processing is effected earlier than the mixing processing by the difference margin, and a receiving-end LMSI temporarily latches the received data into the FIFO register and then uses the data by reading out the latched data at necessary timing. Because the Cram in the instant embodiment has the dual structure comprising the front-side storage area and back-side storage area as explained above in relation to FIG. 6, there would occur no problem even if the writing and reading is performed simultaneously.

The data each of the mixing buses cascade-transferred in the section 1204-2 is received and latched through the receiving-end processing in the section 1205-5 by "MLSI2" at the succeeding stage. Namely, first, the reception and latching, into the FIFO of the cascade input section (CIN) 433, of the data of "mixing bus 0" (MIX1) cascade-transferred from "MLSI1" is started at timing (11). The reception and latching is carried out in a section 1231 (corresponding to the section 1221 of MLSI1), and the latching is terminated at timing (12); by that time, the data of "mixing bus 0" has been written in the FIFO register. Likewise, the data of "mixing bus 1" are received and latched in section 1232 (corresponding to the section 1222 of MLSI1). In a similar manner to the aforementioned, the signals of the other mixing buses, cascade-transferred from "MLSI1", are received and latched.

Meanwhile, mixing processing is performed in the sections 1206-1 and 1206-2 by "MLSI2" in a similar manner to that in the sections 1203-1 and 1203-2 by "MLSI1". To explain more specifically the mixing processing in the section 1206-2, for example, a section 1241 corresponds to processing sections of "step 0"-"step 31" in (b) of FIG. 9, end timing (13) of the section 1241 corresponds to the timing 915-1 in (b) of FIG. 9, a section 1242 corresponds to processing sections of "step 32"-"step 63" in (b) of FIG. 9, end timing (15) of the section 1242 corresponds to the timing 915-2 in (b) of FIG. 9, and so on. Thus, a mixing result of the signals of the individual channels having been subjected to the adjustment processing by "MLSI2" (i.e., signal to be mixed to (i.e., mixed with signals of) "mixing bus 0") is acquired in the section 1241, and the data of "mixing bus 0", already latched after reception via cascade transfer, is added to the acquired mixing result at end timing (13), and the result of the addition is written into Cram1 as data of "mixing bus 0" (MIX1). Further, a mixing result of the signals of the individual channels having been subjected to the adjustment processing by "MLSI2" (i.e., signal to be mixed to "mixing bus 1") is acquired in the section 1242, and data of "mixing bus 1", already latched after reception via cascade transfer, is added to the acquired mixing result at end timing (15), and the result of the addition is written into Cram1 as data of "mixing bus 1" (MIX2). Then, in a similar manner to the aforementioned, signals having been subjected to the adjustment processing by "MLSI2" are written into Cram1 after being reflected in "mixing bus 2" through "mixing bus 95". The data of "mixing bus 0" through "mixing bus 95", having been written into Cram1 in each sampling period in the aforementioned manner, are cascade-transferred to the succeeding-stage MLSI by the transmitting-end processing (cascade transfer sections 1207-1, 1207-2, etc.) in the next sampling period. During that time, there would occur no conflict between the data writing and reading, as noted above. Subsequent cascade transfer is performed in a similar manner to the aforementioned.

As understood from the foregoing, results of the mixing processing performed in a given sampling period by a given MLSI in the instant embodiment are cascade-transferred to the succeeding-stage MLSI in the next sampling period; thus, the time delay caused by the cascade transfer has a length equal to just one sampling period. Namely, if samples simultaneously input from the individual input sections 111-1-**111-*n* to individual "MLSI I1"-"MLSI In" in the illustrated example of FIG. 1A are considered, and assuming that the timing at which signals are reflected in the mixing buses in the last-stage input-side MLSI (MLSI In) is considered as reference timing, the samples input from the input section 111-*n*-1 are reflected in the mixing buses after being delayed by one sampling period, the samples input from the input section 111-*n*-2 are reflected in the mixing buses after being delayed by two sampling period, and so on; the samples input from the input section 111-1** are reflected in the mixing buses after being delayed by (n−1) sampling period. With the prior art technique, on the other hand, in the case where two DSPs are interconnected, data transfer between the DSPs would take at least one sampling period and processing in the receiving-end DSP would take one sampling period; thus, a time delay of a total length equal to two sampling periods would occur between the interconnected DSPs. However, the MLSIs in the instant embodiment can each reduce the time delay to a length equal to just one sampling period and thus are suited for application to business-use equipment whose requested specifications are very strict with respect to the sample displacements.

Because the order in which the MLSIs are cascade-connected as shown in FIG. 1A is known in advance, it is possible to eliminate sample displacements when the samples are reflected in the mixing buses, by controlling the input of the samples, introduced simultaneously to the individual input sections 111-1-111-*n*, such that the input section 111-1 inputs the samples to "MLSI I1" with no time delay, the input section 111-2 inputs the samples to "MLSI I2" with a time delay corresponding to one sampling period, . . . , and the input section 111-*n* inputs the samples to "MLSI In" with a time delay corresponding to (n−1) sampling period.

Figure 13A:
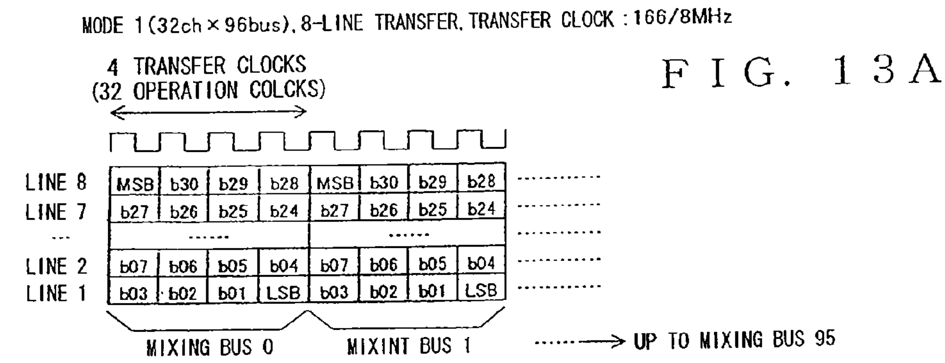
FIGS. 13A-13D are diagrams showing details of bit data transferred by the cascade transfer between the MLSIs.
Figure 13B:
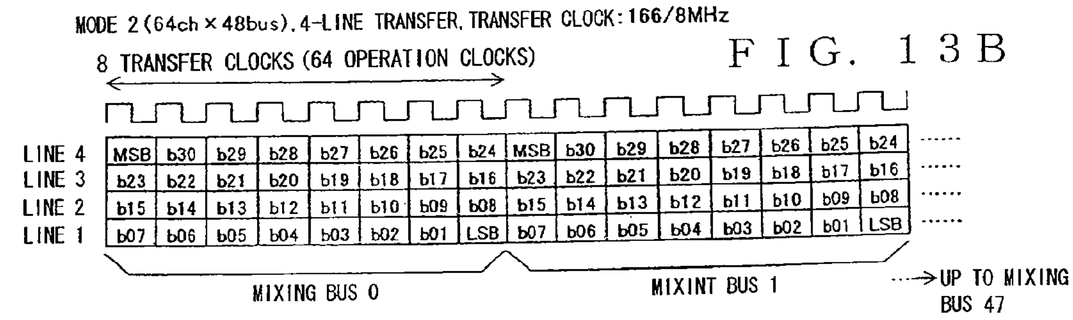

FIGS. 13A-13B show details of bit data transferred in the cascade transfer between the MLSIs. As explained earlier in relation to FIGS. 1A and 1B, the number of mixing buses to be used for mixing per sampling period (i.e., number of data to be transferred via the mixing buses per sampling period) differs among the modes. Further, although the internal components in each of the MLSIs operate in accordance with the operation clocks, the data transfer between the MLSIs has to be executed in accordance with clocks slower than the operation clocks, in order to secure sufficient operational reliability. Thus, in the instant embodiment, the number of transfer lines and the frequency of the clocks to be used for the transfer are changed in accordance with the mode so that necessary data can be transferred in each sampling period in each of the modes.

FIG. 13A shows the transferred bit data in "mode 1". In "mode 1", it is necessary to transfer all of data of "mixing bus 0"-"mixing bus 95" (32×96 bits in total because each data is of 32 bits) in each sampling period. For that purpose, the instant embodiment uses eight (serial) transfer lines between the MLSIs to transfer data of 32 bits every four transfer clocks. The transfer clocks are generated by dividing the frequency of the operation clocks by eight. Thus, in each sampling period, it is possible to effect data transfer corresponding to 3,072 operation clocks. i.e. 384 transfer clocks; because one data can be transferred every four transfer clocks (32 operation clocks), 96 (384/4) data can be transferred in each sampling period in this mode; these 96 data correspond to data of "mixing bus 0"-"mixing bus 95". Section labeled "mixing bus 0" indicates a manner in which one data (of 32 bits), corresponding to a given sampling period, of a signal of "mixing bus 0" is cascade-transferred using the eight transfer lines and in accordance with four transfer clocks; cascade transfer of one data is effected in each of "mixing bus 1" through "mixing bus 95" in the same manner as in "mixing bus 0". The section "mixing bus 0" in FIG. 13A corresponds to "operation clock 0"-"operation clock 31" in (b) of FIG. 9, section "mixing bus 1" in FIG. 13A corresponds to "operation clock 32"-"operation clock 63" in (b) of FIG. 9, . . . , and section of "mixing bus 95" in FIG. 13A corresponds to "operation clock 3,040"-"operation clock 3,071" in (b) of FIG. 9. However, the cascade transfer processing is effected earlier than the mixing processing by the difference margin, as set forth above in relation to FIG. 5, etc.

By effecting the cascade transfer in "mode 1" in the aforementioned manner, it is possible to ensure the operation timing explained above in relation to FIGS. 9 and 12. In (b) of FIG. 9, for example, reception and latching of data of "mixing bus 0" has already been completed at the timing 915-1, reception and latching of data of "mixing bus 1" has already been completed at the timing 915-2, and so on. In this way, it can be ensured that reception and latching, from the preceding-stage MLSI, of the data of the individual mixing buses in the MLSI in question has been completed by the time point when data to be added or mixed to the individual mixing buses is generated.

FIG. 13B shows the transferred bit data in "mode 2". In "mode 2", it is necessary to transfer all of data of "mixing bus 0"-"mixing bus 47" in each sampling period. For that purpose, the instant embodiment uses four transfer lines between the MLSIs to transfer data of 32 bits every eight transfer clocks. The transfer clocks are generated by dividing the frequency of the operation clocks by eight. Thus, in each sampling period, it is possible to effect data transfer corresponding to 3,072 operation clocks. i.e. 384 transfer clocks; because one data can be transferred every eight transfer clocks, 48 (384/8) data can be transferred in each sampling period in this mode; these 48 data correspond to data of "mixing bus 0"-"mixing bus 47".

Figure 13C:
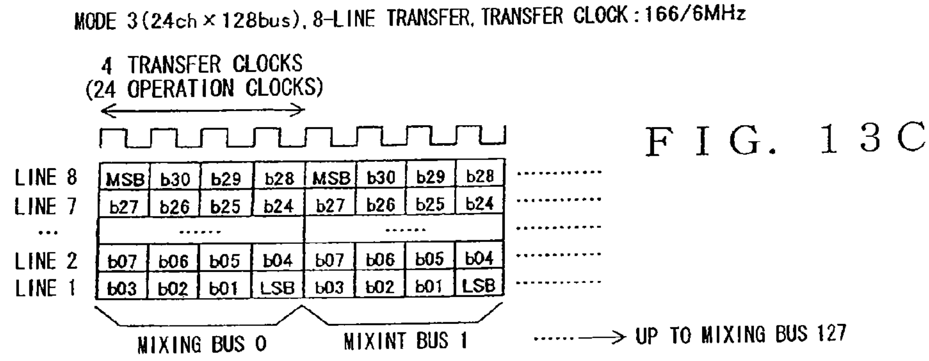

FIG. 13C shows the transferred bit data in "mode 3". In "mode 3", it is necessary to transfer all of data of "mixing bus 0"-"mixing bus 127" in each sampling period. For that purpose, the instant embodiment uses eight transfer lines between the MLSIs to transfer data of 32 bits in accordance with four transfer clocks. The transfer clocks are generated by dividing the frequency of the operation clocks by six. Thus, in each sampling period, it is possible to effect data transfer corresponding to 3,072 operation clocks. i.e. 512 transfer clocks; because one data can be transferred every four transfer clocks, 128 (512/4) data can be transferred in each sampling period in this mode; these 128 data correspond to data of "mixing bus 0"-"mixing bus 127".

Figure 13D:
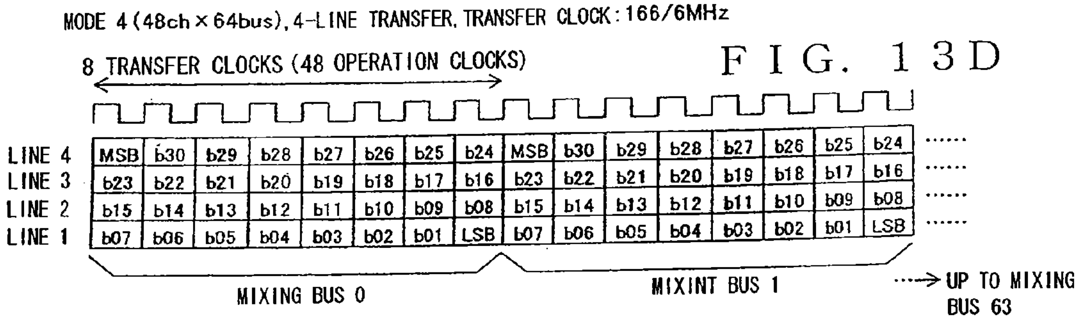

FIG. 13D shows the transferred bit data in "mode 4". In "mode 4", it is necessary to transfer all of data of "mixing bus 0"-"mixing bus 63" in each sampling period. For that purpose, the instant embodiment uses four transfer lines between the MLSIs to transfer data of 32 bits in accordance with eight transfer clocks. The transfer clocks are generated by dividing the frequency of the operation clocks by six. Thus, in each sampling period, it is possible to effect data transfer corresponding to 3,072 operation clocks. i.e. 512 transfer clocks; because one data can be transferred every eight transfer clocks, 64 (512/8) data can be transferred in each sampling period in this mode; these 64 data correspond to data of "mixing bus 0"-"mixing bus 63".

As noted above, the instant embodiment is constructed to change the number of transfer lines to be used for the cascade transfer in accordance with the set mode. This means that the instant embodiment can change the functions of predetermined pins in accordance with the set mode; the pins not used for the cascade transfer are usable for the ordinary function.

Further, for the serial transfer over each of the cascade transfer lines, the MLSI at the data-receiving end supplies the transfer clocks, while the MLSI at the data-receiving end receives data in synchronism with the transfer clocks. Thus, even where the MLSIs are operating in accordance with their respective operation clocks, the cascade transfer between the MLSIs can be carried out appropriately with no problem.

The mixer according to the instant embodiment shown in FIG. 1A includes a user interface via which any one of the modes shown in FIG. 1B can be designated from a not-shown personal computer (PC) connected to the mixer via the communication I/O interface 147 and functional constructions of the mixer and channels shown in FIGS. 2 and 3 can be set from the not-shown personal computer. More specifically, a mixer construction editing program can be executed on the personal computer to designate a desired one of the modes and create/edit the constructions of FIGS. 2 and 3 on a display screen. The thus-created (edited) mixer construction and channel construction are each converted into a data format interpretable by the mixer of FIG. 1A after compilation by the personal computer, and the thus-converted data are transferred to the mixer. The CPU 141 of the mixer of the invention analyzes the transferred data and sets control registers of the individual MLSIs such that the designated functional constructions can be implemented. In this way, the desired mixer construction can be implemented. In operation of the mixer, a current memory is secured within the RAM 143, and control data for controlling current signal processing of the mixer are stored into the current memory; for example, the control data are values indicative of operational states of the operator unit 146. As any one of the operators of the operator unit 146 is operated, the control data, corresponding to the operated operator, stored in the current memory is changed in accordance with the operation of the operator. Such a change in the control data is reflected in the control registers of the MLSIs. For example, (1) when a fader corresponding to the volume control (Vol) 304 of FIG. 3 is operated, the value of the corresponding coefficient data stored in the coefficient memory 702 is changed, (2) when a switch corresponding to the channel-ON switch (CH_ON) 305 of FIG. 3 is turned off, the corresponding coefficient data stored in the coefficient memory 702 is changed to "0", (3) when a switch corresponding to the pre/post switch (PP) 308 of FIG. 3 is operated, the corresponding address stored in the address memory 803 is changed, and so on.

In the above-described embodiment, each of the MLSIs is constructed to operate in accordance with the clocks generated by a separate or independent operation clock generator through operation of a quarts oscillator. Alternatively, some of the MLSIs, adjoining each other, may be grouped so that all of the MLSIs of that group may be caused to operate in accordance with same clocks, because causing such adjoining MLSIs to operate in accordance with same clocks is not so difficult.

With the conventionally-known transfer techniques (using serial buses, audio buses, etc.), it used to take two sampling periods for a given input-side integrated circuit to receive audio signals from a preceding-stage input-side integrated circuit, perform addition per mixing bus and transmit results of the addition to a succeeding-stage input-side integrated circuit. However, the above-described embodiment, where, for every two cascade-connected input-side MLSIs, the timing of the addition processing in the mixing buses in the receiving-end MLSI is controlled to agree with the timing of the cascade-transferred signals, can reduce the time delay per MLSI to one sampling period, i.e. reduce the time delay per MLS by half as compared to the conventionally-known transfer techniques. By improving the aforementioned scheme of the instant embodiment, the time delay per MLSI can be reduced below one sampling period. More specifically, in each of the MLSIs, arrangements may be made such that the mixing processing is started a first difference margin after the start of the cascade reception process and then the cascade transmission process is started a second difference margin after the start of the mixing processing. Further, the operation timing of the cascade-connected MLSIs is adjusted so that the operation timing of the cascade transmission process of the preceding-stage MLSI agrees with the timing of the cascade reception process of the succeeding-stage MLSI. Here, the first difference margin is the same as the difference margin mentioned earlier, while the second difference margin is of a time length within which the processing in the individual mixing buses can be completed. In this case, the time delay per MLSI can be reduced to about the sum of the first and second difference margins.

Whereas the preferred embodiment has been described above in relation to the case where the input-side signal processing integrated circuits and the output-side signal processing integrated circuits are of the same type, they may be of different types.

What is claimed is:

1. A mixing circuit for mixing digital audio signals, comprising:

a plurality of input-side integrated circuits cascade-connected in series and arranged on a main circuit board, and at least one output-side integrated circuit cascade-connected after the last one of the input-side integrated circuits in the series and arranged on the main circuit board, each of said input-side integrated circuits comprising:

a microprogram memory that stores microprograms of a predetermined number H of steps;

a signal processing section that performs signal processing on inputted digital audio signals of J channels, by executing the microprograms stored in said microprogram memory every sampling period, and thereby outputs processed digital audio signals of the J channels;

a reception section that receives, from the preceding input-side integrated circuit in the series, digital audio signals of a predetermined number K of buses;

a mixing section that mixes, for each of K buses, the digital audio signals of J channels from said signal processing section and corresponding one of the digital audio signals of K buses received by said reception section, and thereby outputs mixed digital audio signals of K buses; and a transmission section that transmits, to the succeeding input-side or output-side integrated circuit, the mixed digital audio signals of K buses outputted by said mixing section, said output-side integrated circuit comprising:

a reception section that receives the mixed digital audio signals of K buses from the input-side integrated circuit preceding and connected to said output-side integrated circuit;

a microprogram memory that stores microprograms of a predetermined number H of steps; and a signal processing section that performs signal processing on all or a part of the digital audio signals of K buses, received by said reception section, by executing the microprogram stored in said microprogram memory every sampling period, and thereby outputs the processed digital audio signals to an outside, wherein a number of input channels in said mixing circuit depends on the number of the cascade-connected input-side integrated circuits.

2. A mixing circuit for mixing digital audio signals, comprising:

a mode designation section that designates a mode defining a number J of channels and a number K of mixing buses, a plurality of input-side integrated circuits cascade-connected in series and arranged on a main circuit board, and at least one output-side integrated circuit cascade-connected after the last one of the input-side integrated circuits in the series and arranged on the main circuit board, each of said input-side integrated circuits comprising:

a microprogram memory that stores microprograms of a predetermined number H of steps;

a signal processing section that performs signal processing on inputted digital audio signals of J channels, by executing the microprograms stored in said microprogram memory every sampling period, and thereby outputs processed digital audio signals of the J channels;

a reception section that receives, from the preceding input-side integrated circuit in the series, digital audio signals of a predetermined number K of buses, in accordance with the designated mode;

a mixing section that mixes, for each of K buses, the digital audio signals of J channels from said signal processing section and corresponding one of the digital audio signals of K buses received by said reception section, in accordance with the designated mode, and thereby outputs mixed digital audio signals of K buses; and a transmission section that transmits, to the succeeding input-side or output-side integrated circuit, the mixed digital audio signals of K buses outputted by said mixing section, in accordance with the designated mode, said output-side integrated circuit comprising:

a reception section that receives the mixed digital audio signals of K buses from the input-side integrated circuit preceding and connected to said output-side integrated circuit, in accordance with the designated mode;

a microprogram memory that stores microprograms of a predetermined number H of steps; and a signal processing section that performs signal processing on all or a part of the digital audio signals of K buses, received by said reception section, by executing the microprogram stored in said microprogram memory every sampling period, and thereby outputs the processed digital audio signals to an outside, wherein a number of input channels in said mixing circuit depends on the mode designated by said mode designation section and the number of the cascade-connected input-side integrated circuits.

3. The mixing circuit as claimed in claim 1 wherein a plurality of the output-side integrated circuits are cascade-connected in series, each of said output-side integrated circuits further includes a transmission section that transmits, to the succeeding output-side integrated circuit, the digital audio signals of K buses received by said reception section, and said signal processing section, in each of said output-side integrated circuit, performs signal processing on a part of the digital audio signals of K buses, received by said reception section.

4. The mixing circuit as claimed in claim 2 wherein a plurality of the output-side integrated circuits are cascade-connected in series, each of said output-side integrated circuits further includes a transmission section that transmits, to the succeeding output-side integrated circuit, the digital audio signals of K buses received by said reception section, and said signal processing section, in each of said output-side integrated circuit, performs signal processing on a part of the digital audio signals of K buses, received by said reception section.

* * * * *